United States Patent
Masuda et al.

(10) Patent No.: US 7,807,729 B2
(45) Date of Patent: Oct. 5, 2010

(54) HEAT-EXPANDED MICROSPHERES, PRODUCTION PROCESS THEREOF, HEAT-EXPANDABLE MICROSPHERES AND APPLICATION THEREOF

(75) Inventors: Toshiaki Masuda, Yao (JP); Takashi Fujie, Yao (JP); Ichiro Takahara, Yao (JP); Ikuo Yosejima, Yao (JP); Katsushi Miki, Yao (JP)

(73) Assignee: Matsumoto Yushi-Seiyaku Co., Ltd., Yao-Shi (JP)

( * ) Notice: Subject to any disclaimer, the term of this patent is extended or adjusted under 35 U.S.C. 154(b) by 1050 days.

(21) Appl. No.: 10/595,910

(22) PCT Filed: Nov. 15, 2004

(86) PCT No.: PCT/JP2004/016940

§ 371 (c)(1), (2), (4) Date: May 18, 2006

(87) PCT Pub. No.: WO2005/049698

PCT Pub. Date: Jun. 2, 2005

(65) Prior Publication Data

US 2007/0154711 A1  Jul. 5, 2007

(30) Foreign Application Priority Data

Nov. 19, 2003 (JP) ............................. 2003-428337
Nov. 20, 2003 (JP) ............................. 2003-431301
Aug. 24, 2004 (JP) ............................. 2004-274187

(51) Int. Cl.
*C08J 9/22* (2006.01)
*C08J 9/16* (2006.01)
*B32B 27/00* (2006.01)

(52) U.S. Cl. ........................... 521/57; 521/56; 521/76; 521/142; 428/402.21; 428/403

(58) Field of Classification Search ................. 521/56, 521/57, 76, 88, 142; 428/402, 402.2, 402.21, 428/403
See application file for complete search history.

(56) References Cited

U.S. PATENT DOCUMENTS 3,615,972 A  10/1971  Morehouse at al.
3,915,972 A  10/1975  Altermatt
4,397,799 A   8/1983  Edgren et al.
4,722,943 A *  2/1988  Melber et al. ................. 521/57
5,180,752 A   1/1993  Melber et al.
5,834,526 A * 11/1998  Wu et al. ...................... 521/56
6,225,361 B1 * 5/2001  Nakajima .................... 521/57
2003/0114546 A1 6/2003  Satake et al.
2003/0143399 A1 7/2003  Satake et al.

FOREIGN PATENT DOCUMENTS

| EP | 1508604 A1 * | 5/2005 |
| EP | 1 598 405 A1 | 11/2005 |
| JP | 59-53290 B2 | 12/1984 |
| JP | 62-201231 A | 9/1987 |
| JP | 8-29245 B2 | 3/1996 |
| JP | 8-217905 A | 8/1996 |
| JP | 2927933 B2 | 5/1999 |
| JP | 11-269343 A | 10/1999 |
| JP | 3067932 B2 | 5/2000 |
| JP | 2001-151895 A | 6/2001 |
| JP | 2002-12693 A | 1/2002 |
| WO | WO99/37706 A1 | 7/1999 |
| WO | WO-03099955 A1 * | 12/2003 |
| WO | WO2004/074396 A1 | 9/2004 |

* cited by examiner

*Primary Examiner*—Irina S Zemel
*Assistant Examiner*—Jeffrey Lenihan
(74) *Attorney, Agent, or Firm*—Global IP Counselors, LLP

(57) ABSTRACT

A production process for heat-expanded microspheres includes the step of providing a gaseous fluid containing heat-expandable microspheres, which includes a shell of thermoplastic resin and a blowing agent encapsulated therein having a boiling point not higher than the softening point of the thermoplastic resin and have an average particle size from 1 to 100 μm. The gaseous fluid is fed through a gas-introducing tube having a dispersion nozzle on its outlet that is fixed inside a conduit having a hot gas flow flowing therethrough. A jet of the gaseous fluid is emitted through the dispersion nozzle. Further, the gaseous fluid is collided on a collision plate fixed under the dispersion nozzle so as to disperse the heat-expandable microspheres in the hot gas flow. The dispersed heat-expandable microspheres are heated in the hot gas flow at a temperature not lower than their expansion initiating temperature and thus expanded.

33 Claims, 1 Drawing Sheet

HEAT-EXPANDED MICROSPHERES, PRODUCTION PROCESS THEREOF, HEAT-EXPANDABLE MICROSPHERES AND APPLICATION THEREOF

TECHNICAL FIELD

The present invention relates to heat-expanded microspheres, a production process thereof, heat-expandable microspheres, and application thereof. More specifically, the present invention relates to heat-expanded microspheres, which have a particle size distribution with a coefficient of variation showing a minimum difference before and after heat expansion, and which contain slight ratios of aggregated microspheres and microspheres of high true specific gravity (microspheres not having been expanded to a prescribed degree); a production process thereof, heat-expandable microspheres, which contain slight ratios of aggregated microspheres and microspheres of high true specific gravity, are resistant to damage from external force, prevent the hardening and shrinkage of porous material compositions for weight reduction in molding processes, and solve the problem of time-dependent thermal deflation; and the application thereof.

In the present invention, the heat-expandable and heat-expanded microspheres in which a specific fluorine compound is encapsulated, are filled in a cavity of a tire-and-rim assembly, as a superior sealing material and internal pressure supplier when the tire is damaged.

TECHNICAL BACKGROUND

Heat-expandable microspheres comprising a structure of a shell of thermoplastic resin and a blowing agent encapsulated therein are generally called heat-expandable microcapsules. Vinylidene chloride copolymers, acrylonitrile copolymers, and acrylic copolymers are usually employed as the thermoplastic resin, and hydrocarbons, such as isobutane and isopentane, are mostly employed as the blowing agent. (Refer to Patent Literature 1.)

Such heat-expandable microcapsules are processed into lightweight hollow particles (heat-expanded microspheres) with heating and expanding. A process for spraying a dispersion of heat-expandable microcapsules in hot gas to expand and dry the microcapsules simultaneously has been proposed as a process for expanding heat-expandable microcapsules. (Refer to Patent Literature 2.) The process, however, has a problem, in that the deposition of aggregated microcapsules at the end of the spray used is highly likely.

A process for producing hollow particulates by expanding heat-expandable microcapsules, which have been produced by impregnating the same with a blowing agent, in hot gas from an electric hot gas generator has been proposed. (Refer to Patent Literature 3.) As described in comparative example 3 in Patent Literature 3, the process completely failed to produce particulates having preferable properties, when the process was applied to expand heat-expanding microcapsules in which a blowing agent was encapsulated, because the process could not control the retention time of each heat-expandable microsphere in the device, and the resultant hollow particulates had low expansion coefficients and shrunk.

Further, a process for producing porous particulates wherein dried heat-expandable microspheres on a belt conveyer are heated and expanded at a temperature higher than their expanding temperature and transferred from the conveyer with air flow has been proposed. (Refer to Patent Literature 4.) The process has a problem, in that non-uniform product is possibly produced due to varied true specific gravity and increased coefficient of variation in particle size distribution of resultant porous particulates, both of which result from unexpanded heat-expandable microspheres migrating into expanded porous particulates being transferred with air flow.

It is preferable to minimize the generation of aggregated microspheres, usually by decreasing the quantity of remaining raw material, heat-expandable microcapsules, in the expanding operation of the heat-expandable microcapsules. In order to meet such requirement, expanding each of heat-expandable microcapsules with the same heat history is considered essential.

For example, a process for expanding microcapsules wherein heat-expandable microcapsules are expanded in an aqueous slurry, and the slurry containing expanded particles is passed between grinding stones to disperse aggregated particulates, has been proposed. (Refer to Patent Literature 5.) Although the process can apply the same heat history to all of heat-expandable microcapsules, the fusion of expanded microcapsules appears as a problem when the expanded microcapsules need to be dried for blending in plastics, paints, rubber, and sealants, being different from employing the aqueous slurry.

A process for producing porous particulates wherein heat-expandable microspheres are heated and expanded after being dispersed into a slurry has been proposed. (Refer to Patent Literature 6.) The process can also apply the same heat history to all heat-expandable microspheres. But the process has problems, in that there is a low production efficiency due to the steps of deliquoring slurry containing expanded heat-expandable microspheres and drying, which are required for producing dried hollow particulates, and possible coagulation of hollow particulates, especially those produced from heat-expandable microspheres having shells with low softening points, at the drying step.

Heat-expandable microspheres, which have particle sizes distributed in a sharp peak, and their production process, have been proposed. (Refer to Patent Literature 7.) The literature discloses that the heat-expandable microspheres produced in the process expand sharply into expanded microspheres of uniform shape and size, though the expanding procedure is not clearly specified. Although the heat-expandable microspheres have uniform particle size distribution, it is apparent to those skilled in the art that expanded microspheres of uniform particle size distribution without aggregated microspheres cannot be produced in the known conventional expanding processes.

As clearly described above, it is required to minimize remaining raw material and the generation of aggregated microspheres in both dry and wet expanding processes, though it has not been attained at present.

Hollow particulates are blended in porous molded products in order to lighten the products as described above. Porous molded products are usually produced by mixing and kneading a base component, filler, and hollow particulates to prepare a porous material composition, and by molding the composition into a prescribed form. In the mixing and kneading process, hollow particulates are often subjected to great external force which damages a portion of the particulates, and it leads to a problem, which is the unattainable lightening of a product to a prescribed level. In addition, thermoplastic resin forming the shell of hollow particulates is softened with heat and pressure applied to the porous material composition in the molding process, and the hollow particulates are subjected to external pressure. The internal pressure generated by the vapor of the blowing agent encapsulated in the hollow particulates cannot resist the external pressure, and thus the hollow particulates shrink to some extent in the molding process. As a result, there are problems with the hardening and shrinking of products, such as shrunk porous molded products, poor dimensional stability, and unattainable lightening of a product to a prescribed level.

For solving those problems, a porous material composition in which heat-expandable microspheres and hollow particulates are blended has been proposed. (Refer to Patent Literature 8.) Although the hardening and shrinking are solved with the composition, it requires a complex step of preparing two different particles (heat-expandable microspheres and hollow particulates). In addition, porous molded products are thermally deflated with time, resulting in the decrease of their volume when used at high temperature, though such deflation is not remarkable when they are used at normal temperature. The cause of the deflation is considered to be the time-dependent leakage of a blowing agent encapsulated in hollow particulates.

For solving the problem, thermoplastic resins of low gas-permeability, such as acrylonitrile copolymer, are employed as the thermoplastic resin for forming the shell, though it is not enough to solve the problem.

Lightweight hollow particulates produced by heating and expanding heat-expandable microcapsules have been applied as lightening agents for resins and ceramics as mentioned above, heat insulators for thermosensitive paper and paints, bulkiness-imparting agents for nonwoven fabrics, shock-absorbers for automobile exteriors, and surface modifiers for attaining roughness on wall papers. The inventors of the present invention have recently developed novel heat-expandable microcapsules in which a specific fluorine compound is encapsulated as a blowing agent, and have found the application of porous particles produced by heating and expanding the microcapsules as a volume-retaining agent for pressure vessels. (Refer to Patent Literature 9.)

Patent Literature 1: U.S. Pat. No. 3,915,972
Patent Literature 2: Published Examined Japanese Patent Application, Sho 59-53290
Patent Literature 3: Published Unexamined Japanese Patent Application, Hei 8-217905
Patent Literature 4: Published Examined Japanese Patent Application, Hei 8-29245
Patent Literature 5: Published Unexamined Japanese Patent Application, Sho 62-201231
Patent Literature 6: Japanese Patent 2927933
Patent Literature 7: WO 99/37706
Patent Literature 8: Japanese Patent 3067932
Patent Literature 9: WO 2004/074396

DISCLOSURE OF THE INVENTION

An object of the present invention is to provide heat-expanded microspheres, which have a particle size distribution with a coefficient of variation showing only a slight difference before and after heat-expansion, and which contain extremely low ratios of aggregated microspheres and microspheres of high true specific gravity, and to provide a production process thereof.

Another object of the present invention is to provide heat-expanded microspheres and heat-expandable microspheres containing extremely low ratios of aggregated microspheres and microspheres of high true specific gravity, that are resistant to damage from external force, that prevent hardening and shrinking of a porous material composition in molding when they are blended in order to lighten the porous material composition, and solve the problem of time-dependent thermal deflation of the resultant porous molded products.

Another object of the present invention is to provide porous molded products that are sufficiently lightened, prevent hardening and shrinking in molding, are free from time-dependent thermal deflation, and have high dimensional stability.

Another object of the present invention is to provide heat-expandable microspheres and heat-expanded microspheres, which exhibit superior properties as a tire damage sealant and an internal-pressure supplier for a tire when filled in the inside of a tire-and-rim assembly, to provide a production process of the heat-expanded microspheres, and to provide heat-expandable microspheres as a raw material for the heat-expanded microspheres.

For solving those problems described above, the inventors of the present invention have studied and obtained the findings as follows.

(1) In a specific dry process in which heat-expanded microspheres are produced by heating and expanding heat-expandable microspheres that are properly dispersed, the difference in the coefficient of variation of their particle size distribution before and after heat-expansion can be decreased, the amount of raw material and slightly expanded microspheres can be lowered, and the generation of aggregated microspheres is suppressed.

(2) In the production process (1), almost completely heat-expanded microspheres, and heat-expanded microspheres that are capable of re-expanding to a prescribed degree (in other words, heat-expanded microspheres having a re-expansion initiating temperature), can be produced by controlling the expansion conditions.

(3) The heat-expanded microspheres that are capable of re-expanding produced in the above (2) are also novel heat-expandable microspheres having properties which were not found in the past.

(4) In a porous material composition containing the heat-expanded microspheres having a capacity of re-expanding in the above (2) and/or the heat-expandable microspheres in the above (3), the microspheres have comparatively thick shells and are durable against rupture under external force. Those microspheres prevent hardening and shrinking of the composition in molding, prevent time-dependent thermal deflation of products at high temperature, and attain superior dimensional stability owing to their optimum heat-expanding property, etc.

The inventors have also obtained the findings on heat-expandable microspheres and heat-expanded microspheres containing a specific fluorine compound as a blowing agent as described in the following (5) to (8).

(5) A fluorine compound is preferable for its flame-retardant properties. The heat-expanded microspheres produced by heating and expanding heat-expandable microspheres in this specific process made a damaged tire runnable after its internal pressure has decreased due to damage, when the expanded microspheres were filled in a tire-and-rim assembly to test the applicability of the microspheres for running damaged tires.

(6) Heat-expanded microspheres that are capable of re-expanding and produced by controlling the expansion of heat-expandable microspheres, can be filled in a tire-and-rim assembly for running a damaged tire in which internal pressure has decreased similar to heat-expanded microspheres produced by expanding heat-expandable microspheres almost completely in the specific process. It is preferable for the heat-expanded microspheres that are capable of re-expanding, in particular, to have the ability to start re-expanding at a prescribed high temperature.

Recently, tires are required to run normally even at high temperatures. It is also required that tires have the ability to supply internal pressure by re-expanding immediately after the tire is damaged and its internal pressure has decreased.

(7) Heat-expanded microspheres that are capable of re-expanding can re-expand at a prescribed high temperature if the shell of the microspheres is formed of thermoplastic resin produced by polymerizing a monomer mixture consisting essentially of a nitrile monomer and a monomer having a carboxyl group.

(8) Heat-expanded microspheres that are capable of re-expanding and which have a specific anti-blocking agent adhered to the outer surface of their shell, quickly seal damage on a tire and exhibit high performance for supplying internal pressure to the fire.

With these findings from (1) to (8), the inventors have achieved the present invention specifically described as follows.

The first production process for heat-expanded microspheres of the present invention comprises the step of feeding a gas fluid containing heat-expandable microspheres through a gas-introducing tube having a dispersion nozzle on its outlet and fixed inside a hot gas flow, and then jetting the gas flow from the dispersion nozzle, wherein each of the heat-expandable microspheres comprises a shell of thermoplastic resin, a blowing agent encapsulated therein having a boiling point not higher than the softening point of the thermoplastic resin, and an average particle size from 1 to 100 μm, and then colliding the gas fluid with a collision plate fixed on the downstream side of the dispersion nozzle to disperse the heat-expandable microspheres in the hot gas flow, and heating the dispersed heat-expandable microspheres in the hot gas flow at a temperature not lower than their expansion initiating temperature and thus expanding the heat-expandable microspheres.

The second production process for heat-expanded microspheres of the present invention comprises a step of jetting a gas fluid containing heat-expandable microspheres through at least one dispersion nozzle fixed outside a hot gas flow, and dispersing the gas fluid in the hot gas flow, wherein each of the heat-expandable microspheres comprises a shell of thermoplastic resin, and a blowing agent being encapsulated therein having a boiling point not higher than the softening point of the thermoplastic resin, and an average particle size from 1 to 100 μm, and then heating the dispersed heat-expandable microspheres in the hot gas flow at a temperature not lower than their expansion initiating temperature to thereby expand the heat-expandable microspheres.

Heat-expanded microspheres of the present invention are produced in a process wherein heat-expandable microspheres, which comprise a shell of thermoplastic resin, and a blowing agent with a boiling point not higher than the softening point of the thermoplastic resin encapsulated in the shell, and have an average particle size ranging from 1 to 100 μm, are heated and expanded at a temperature not lower than their expansion initiating temperature, and the heat-expanded microspheres contain not more than 5 weight percent of aggregated microspheres and not more than 5 weight percent of microspheres having a true specific gravity not lower than 0.79 g/cc at 25° C.

Heat-expandable microspheres of the present invention comprise a shell of thermoplastic resin, and a blowing agent which has a boiling point not higher than the softening point of the thermoplastic resin and is encapsulated in the shell, have an average particle size ranging from 1 to 1000 μm and an expansion coefficient above 100%, and contain not more than 5 weight percent of aggregated microspheres and not more than 5 weight percent of microspheres having a true specific gravity not lower than 0.79 g/cc at 25° C.

The porous material composition of the present invention contains a base component, and the heat-expanded microspheres and/or the heat-expandable microspheres.

The porous molded products of the present invention are produced by molding the porous material composition.

Other heat-expandable microspheres of the present invention comprise a shell of thermoplastic resin, and a blowing agent with a boiling point not higher than the softening point of the thermoplastic resin encapsulated in the shell, and have an average particle size ranging from 1 to 100 μm. The blowing agent contains a $C_{2-10}$ fluorine compound which has an ether structure, and does not contain chlorine and bromine atoms. The thermoplastic resin is produced by polymerizing a monomer mixture consisting essentially of a nitrile monomer and a monomer having a carboxyl group, the monomer mixture in which the weight ratio of the nitrile monomer ranging from 20 to 80 weight percent, and the weight ratio of the monomer having a carboxyl group ranging from 80 to 20 weight percent.

Further, other heat-expandable microspheres of the present invention comprise a shell of thermoplastic resin, a blowing agent with a boiling point not higher than the softening point of the thermoplastic resin being encapsulated in the shell, and an anti-blocking agent adhered on the outer surface of the shell, and have an average particle size ranging from 1 to 100 μm. The blowing agent contains a $C_{2-10}$ fluorine compound which has an ether structure, and does not contain chlorine and bromine atoms. The thermoplastic resin is produced by polymerizing a monomer mixture consisting essentially of a nitrile monomer and a monomer having a carboxyl group, the monomer mixture in which the weight ratio of the nitrile monomer ranging from 20 to 80 weight percent, and the weight ratio of the monomer having a carboxyl group ranging from 80 to 20 weight percent. The anti-blocking agent comprises at least one substance selected from a group consisting of organic compounds having a melting point not lower than 90° C. and inorganic compounds having a layered structure.

Further, other heat-expandable microspheres of the present invention comprise a shell of thermoplastic resin, a blowing agent with a boiling point not higher than the softening point of the thermoplastic resin being encapsulated in the shell, and an anti-blocking agent adhered on the outer surface of the shell, and have an average particle size ranging from 1 to 100 μm. The blowing agent contains a $C_{2-10}$ fluorine compound which has an ether structure, and does not contain chlorine and bromine atoms. The anti-blocking agent comprises at least one substance selected from a group consisting of organic compounds having a melting point not lower than 90° C. and inorganic compounds having layered structure.

DESCRIPTION OF REFERENCE NUMERALS

Figure 1:
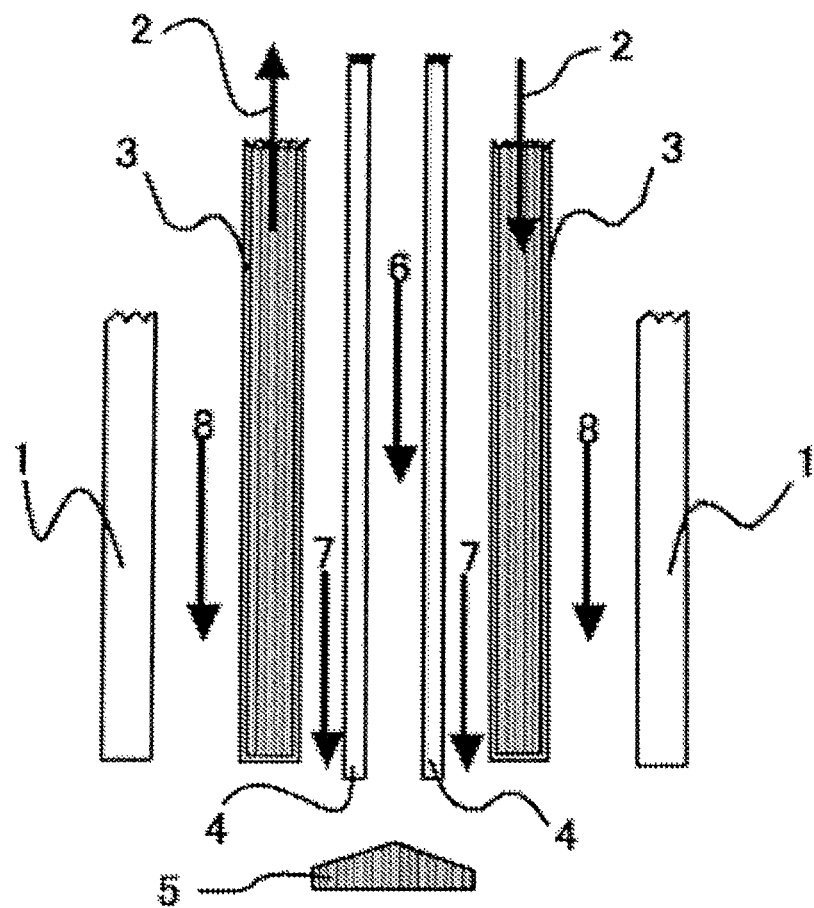
FIG. 1 is a diagram of the expanding device of the production machine employed in the production process of the present invention.

1 and 11: hot gas nozzle
2: cooling medium flow
3: overheat protection pipe
4 and 12: dispersion nozzle 5: collision plate
6 and 14: gas fluid containing heat-expandable microspheres
7: gas flow
8 and 13: hot gas flow

BEST MODE FOR CARRYING OUT THE INVENTION

A. Production Process for Heat-Expanded Microspheres a. Heat-Expandable Microspheres Used as a Starting Material In the first and second production processes for the heat-expanded microspheres of the present invention, the heat-expandable microspheres fed as a starting material (hereinafter sometimes referred to as "raw microspheres") comprise a shell of thermoplastic resin, and a blowing agent which has a boiling point not higher than the softening point of the thermoplastic resin and is encapsulated in the shell, have an average particle size ranging from 1 to 100 μm, and are not particularly limited.

The blowing agent encapsulated in a shell comprising a thermoplastic resin is a substance having a boiling point not higher than the softening point of the thermoplastic resin, and is not particularly limited. The examples of such blowing agents are $C_{1-12}$ hydrocarbons and their halogen compounds, fluorine compounds, tetraalkyl silane and those which thermally decompose to generate gas, such as azodicarbonamide. At least one of those blowing agents is applied.

The examples of $C_{1-12}$ hydrocarbons are propane, cyclopropane, propylene, butane, normal butane, isobutane, cyclobutane, normal pentane, cyclopentane, isopentane, neopentane, normal hexane, isohexane, cyclohexane, heptane, cycloheptane, octane, isooctane, cyclooctane, 2-methyl pentane, 2,2-dimethyl butane, and petroleum ether. Any of these hydrocarbons having a linear, branched or ali-cyclic structure are applicable, and aliphatic hydrocarbons are preferable.

The examples of halogen compounds of $C_{1-12}$ hydrocarbons are methyl chloride, methylene chloride, chloroform, and carbon tetrachloride. Halogen compounds (fluorine compounds, chlorine compounds, bromine compounds, iodine compounds, etc.) of the above-mentioned hydrocarbons are preferable.

Fluorine compounds are not particularly limited, but $C_{2-10}$ compounds having an ether structure and containing no chlorine and bromine compounds are preferable. Examples of such compounds are hydrofluoroethers, such as $C_3H_2F_7OCF_2H$, $C_3HF_6OCH_3$, $C_2HF_4OC_2H_2F_3$, $C_2H_2F_3OC_2H_2F_3$, $C_4HF_8OCH_3$, $C_3H_2F_5OC_2H_3F_2$, $C_3HF_6OC_2H_2F_3$, $C_3H_3F_4OCHF_2$, $C_3HF_6OC_3H_2F_5$, $C_4H_3F_6OCHF_2$, $C_3H_3F_4OC_2HF_4$, $C_3HF_6OC_3H_3F_4$, $C_3F_7OCH_3$, $C_4F_9OCH_3$, $C_4F_9OC_2H_5$, and $C_7F_{15}OC_2H_5$. Those hydrofluoroethers may have either linear or branched (fluoro) alkyl groups.

The tetraalkyl silanes are those containing the same or different $C_{1-5}$ alkyl groups. Examples of such compounds are tetraalkyl silanes, such as tetramethyl silane, trimethylethyl silane, trimethyl isopropyl silane, and trimethyl-n-propyl silane.

The compounds generating gas through thermal degradation are azodicarbonamide, N,N'-dinitroso pentamethylene tetramine, 4,4'-oxy bis(benzenesulfonyl hydrazide).

All of the blowing agent may comprise fluorine compounds, though compounds other than fluorine compounds having a boiling point not higher than the softening point of the thermoplastic resin described below may be applied in combination with a fluorine compound. Such compounds are not particularly limited, and those selected from the examples of blowing agents described above can be applied. Compounds other than fluorine compounds can be selected according to the range of the expanding temperature of raw microspheres. In order to apply a fluorine compound as a blowing agent, the weight ratio of the fluorine compound is preferably greater than 50 weight percent of the whole of the blowing agent, more preferably greater than 80 weight percent, and most preferably greater than 95 weight percent. Greater weight ratio of a fluorine compound in a blowing agent is more advantageous in order to reflect more of the properties of the fluorine compound in the raw microspheres, and impart flame retardation and flameproof properties to the raw microspheres.

The raw microspheres comprise, for example, thermoplastic resin produced by polymerizing a monomer mixture containing a radically polymerizable monomer, and the shell of the raw material microspheres is formed by blending a proper amount of a polymerization initiator in the monomer mixture.

The examples of the radically polymerizable monomers, which are not particularly limited, are nitrile monomers, such as acrylonitrile, methacrylonitrile, α-chloroacrylonitrile, α-ethoxyacrylonitrile, fumaronitrile; monomers having a carboxyl group, such as acrylic acid, methacrylic acid, itaconic acid, maleic acid, fumaric acid, citraconic acid; vinylidene chloride; vinyl acetate; (meth)acrylate monomers, such as methyl (meth)acrylate, ethyl (meth)acrylate, n-butyl (meth)acrylate, isobutyl (meth)acrylate, t-butyl (meth)acrylate, isobornyl (meth)acrylate, cyclohexyl (meth)acrylate, benzyl (meth)acrylate, and β-carboxyethyl acrylate; acryl amide monomers, such as acryl amide, substituted acryl amide, methacrylamide, and substituted methacrylamide; and maleimide monomers, such as N-phenyl maleimide, N-(2-chlorophenyl) maleimide, N-cyclohexyl maleimide, and N-lauryl maleimide. One or a plurality of those radically polymerizable monomers are applicable.

A monomer mixture consisting essentially of a nitrile monomer is preferable for employing a blowing agent containing fluorine compounds, because such monomer mixture imparts heat resistance to thermoplastic resin. The preferable weight ratio of the nitrile monomer in the monomer mixture is 80 weight percent, more preferably 90 weight percent, and most preferably 95 weight percent, considering the heat resistance of the resultant thermoplastic resin.

A monomer mixture containing a nitrile monomer and a monomer having a carboxyl group is more preferable, because such monomer mixture imparts heat-resistance to raw microcapsules, and imparts a re-expanding capacity to heat-expanded microspheres produced by expanding raw microspheres and to re-expand heat-expanded microspheres at 90° C. or higher temperature (preferably 100° C. or higher and more preferably 120° C. or higher), as described below. The preferable weight ratio of the nitrile monomer in a monomer mixture is 20 to 80 weight percent, more preferably 20 to 60 weight percent, further preferably 20 to 50 weight percent, and most preferably 20 to 40 weight percent, considering the retention of a blowing agent encapsulated in microspheres, its blowing performance, the control over the re-expansion initiating temperature of heat-expanded microspheres, and the evaluation of high-speed running performance with normal internal pressure described below. The preferable weight ratio of the monomer having a carboxyl group in a monomer mixture is 20 to 80 weight percent, more preferably 40 to 80 weight percent, further preferably 50 to 80 weight percent, and most preferably 60 to 80 weight percent, considering the control over the re-expansion initiating temperature of heat-expanded microspheres, the evaluation of high-speed running performance with normal internal pressure described below, the retention of a blowing agent encapsulated in microspheres, and its blowing performance.

The monomer mixture may contain a polymerizable monomer having at least two polymerizable double bonds (a cross-linking agent) in addition to the radically polymerizable monomers. Polymerization with a cross-linking agent contributes to a reduced ratio of aggregated microspheres in heat-expanded microspheres produced by the production process of the present invention, minimum reduction of the retention of encapsulated blowing agent in microspheres after heat-expansion (retention of encapsulated blowing agent), and efficient heat-expansion of microspheres.

The retention (%) of encapsulated blowing agent in microspheres after heat-expansion in the present invention is defined as $G_2/G_1 \times 100$, where $G_1$ is the retention of a blowing agent encapsulated in raw material microspheres before expansion, and $G_2$ is the retention of blowing agent encapsulated in heat-expanded microspheres produced by heating and expanding.

The examples of cross-linking agents, but not limited to these examples, are aromatic divinyl compounds, such as divinyl benzene and divinyl naphthalene; and di(meth)acrylates, such as allyl methacrylate, triacrylformal, triallyl isocyanate, ethylene glycol di(meth)acrylate, diethylene glycol di(meth)acrylate, triethylene glycol di(meth)acrylate, 1,4-butanediol di(meth)acrylate, 1,9-nonanediol di(meth)acrylate, 1,10-decanediol di(meth)acrylate, PEG (200) di(meth)acrylate, PEG (400) di(meth)acrylate, PEG (600) di(meth)acrylate, neopentylglycol di(meth)acrylate, 1,4-butanediol dimethacrylate, 1,6-hexanediol di(meth)acrylate, 1,9-nonanediol di(meth)acrylate, trimethylolpropane trimethacrylate, glycerin dimethacrylate, dimethylol tricyclodecane diacrylate, pentaerythritol tri(meth)acrylate, pentaerythritol tetraacrylate, dipentaerythritol hexaacrylate, neopentylglycol acrylic acid benzoate, trimethylolpropane acrylic acid benzoate, 2-hydroxy-3-acryloyloxypropyl methacrylate, hydroxypivalic acid neopentylglycol diacrylate, ditrimethylolpropane tetraacrylate, and 2-butyl-2-ethyl-1,3-propanediol diacrylate. One of or a plurality of those cross-linking agents are applicable.

The preferable weight ratio of the cross-linking agents is 0.01 to 5 weight percent of the monomer mixture, more preferably 0.05 to 3 weight percent, considering the degree of cross-linking, the retention of the blowing agent encapsulated in the shell, and the heat-resistance and heat-expansion of the microspheres, though the weight ratio is not restricted within those ranges.

The polymerization initiator is not particularly limited, and known polymerization initiators can be applied. The examples of those polymerization initiators are peroxides, such as t-butyl peroxy isobutylate, t-butyl peroxy-2-ethyl hexanoate, t-hexyl peroxy-2-ethyl hexanoate, 2,5-dimethyl-2,5-bis(2-ethyl hexanoyl peroxy)hexane, 1,1,3,3-tetramethylbutyl peroxy-2-ethyl hexanoate, t-butyl peroxy pivalate, t-hexyl peroxy pivalate, t-butyl peroxy neodecanoate, t-hexyl peroxy neodecanoate, 1-cyclohexyl-1-methylethyl peroxy neodecanoate, 1,1,3,3-tetramethylbutyl peroxy neodecanoate, cumyl peroxy neodecanoate, di-n-propyl peroxy dicarbonate, diisopropyl peroxy dicarbonate, bis(4-t-butylcyclohexyl)peroxy dicarbonate, di-sec-butyl peroxy dicarbonate, di-2-ethoxyethyl peroxy dicarbonate, di-2-ethylhexyl peroxy dicarbonate, di-3-methoxybutyl peroxy dicarbonate, 3,5,5-trimethyl hexanoyl peroxide, octanoyl peroxide, lauroyl peroxide, stearyl peroxide, succinic acid peroxide, and benzoil peroxide; and azo compounds, such as 2,2'-azobis(4-methoxy-2,4-dimethyl valeronitrile), 2,2'-azobis isobutyronitrile, 2,2'-azobis(2,4-dimethyl valeronitrile), 2,2'-azobis(2-methyl propionate), and 2,2'-azobis(2-methyl butyronitrile). Preferable polymerization initiators are oil-soluble polymerization initiators which are soluble in radically polymerizable monomers.

The raw microspheres are produced in conventionally known processes for producing heat-expandable microcapsules.

Those processes include suspension polymerization wherein a mixture of radically polymerizable monomers, a cross-linking agent as an option, and a polymerization initiator is mixed with a blowing agent, and the resultant mixture is suspension polymerized in an aqueous medium containing a proper dispersion stabilizer.

The examples of the dispersion stabilizers in the aqueous suspension are colloidal silica, colloidal calcium carbonate, magnesium hydroxide, calcium phosphate, aluminum hydroxide, ferric hydroxide, calcium sulfate, sodium sulfate, calcium oxalate, calcium carbonate, barium carbonate, magnesium carbonate, and alumina sol. The preferable ratio of the dispersion stabilizer in the monomer mixture is 0.1 to 20 weight percent. As dispersion-stabilizing auxiliaries, polymer-type such as diethanol amine-aliphatic dicarboxylic acid condensates, gelatine, polyvinyl pyrolidone, methyl cellulose, polyethylene oxide and polyvinyl alcohol; and emulsifiers including cationic surfactants such as alkyltrimethyl ammonium chloride and dialkyldimethyl ammonium chloride, anionic surfactants such as sodium alkyl sulfate, and amphoteric surfactants such as alkyldimethyl betaine aminoacetate and alkyldihydroxyethyl betaine aminoacetate may be applied. The preferable ratio of the dispersion-stabilizing auxiliary is 0.05 to 2 weight percent of the monomer mixture.

An aqueous suspension containing a dispersion stabilizer is prepared by mixing a dispersion stabilizer and an auxiliary for the dispersion stabilizer in water (for example, deionized water). The pH of the aqueous suspension during polymerization is properly determined according to the variants of a dispersion stabilizer and an auxiliary for the dispersion stabilizer. A water-soluble reducing agent may be added to the aqueous suspension, and it suppresses the formation of aggregated microspheres during polymerization. The examples of the water-soluble reducing agents are nitrites of alkali metals, such as sodium nitrite and potassium nitrite, stannous chloride, stannic chloride, ferrous chloride, ferric chloride, ferrous sulfate, and water-soluble ascorbic acids. Among those, nitrites of alkali metals are preferable considering their stability in water. The preferable ratio of the reducing agents is 0.0001 to 1 weight percent of the monomer mixture, more preferably 0.0003 to 0.1 weight percent.

The polymerization temperature is controlled according to the variants of polymerization initiators, preferably ranging from 40 to 100° C., more preferably from 45 to 90° C., and most preferably from 50 to 85° C. The initial pressure for the polymerization ranges from 0 to 5.0 MPa in gage pressure, preferably from 0.1 to 3.0 MPa, and more preferably from 0.2 to 2.0 MPa.

The ratio of the blowing agent in the resultant raw microspheres is controlled from 2 to 85 weight percent of the raw microspheres, more preferably from 5 to 60 weight percent, and most preferably from 7 to 50 weight percent, from the view point of attaining superior blowing performance which enables expanded microspheres to function satisfactorily as an internal pressure supplier for tires when filled in a tire-and-rim assembly, and of achieving sufficient thickness of the thermoplastic resin shell of the heat-expandable microspheres in order to maintain the retention of encapsulated blowing agent. The preferable ratio of a blowing agent containing fluorine compounds is 10 to 60 weight percent, more preferably 15 to 50 weight percent.

The average particle size of raw microspheres may be freely designed according to their application, and therefore is not particularly limited. For encapsulating a blowing agent containing fluorine compounds, a preferable average particle size ranges is from 1 to 100 µm, more preferably 2 to 80 µm, and most preferably 5 to 60 µm.

The coefficient of variation, CV, of the particle size distribution of the raw microspheres is not particularly limited, but is preferably 30% or less, more preferably 27% or less, and most preferably 25% or less. The coefficient of variation, CV, is calculated from the following expressions (1) and (2).

[Expression 1]

$$CV = (s/<x>) \times 100(\%) \quad (1)$$

$$s = \left\{ \sum_{i=1}^{n} (xi - <x>)^2 / (n-1) \right\}^{1/2} \quad (2)$$

Where s is a standard deviation of particle size, $<x>$ is an average particle size, xi is a particle size of an i-th greatest particle, and n is the number of particles.

Adhering a particulate filler on the outer surface of the shell of raw microspheres is preferable for improving their dispersibility and flowability.

A particulate filler may be an organic or inorganic filler, and the variants and amount of particulate fillers are selected according to the purpose of their application.

The examples of organic fillers are metal soaps, such as magnesium stearate, calcium stearate, zinc stearate, barium stearate, and lithium stearate; synthetic waxes, such as polyethylene wax, lauric acid amide, myristic acid amide, palmitic acid amide, stearic acid amide, and hydrogenated castor oil; and resin powders, such as polyacryl amide, polyimide, nylon, methyl polymethacrylate, polyethylene, and polytetrafluoroethylene.

The examples of inorganic fillers are those having a layered structure, such as talc, mica, bentonite, sericite, carbon black, molybdenum disulfide, tungsten disulfide, carbon fluoride, calcium fluoride, and boron nitride; and others, such as silica, alumina, isinglass, calcium carbonate, calcium hydroxide, calcium phosphate, magnesium hydroxide, magnesium phosphate, barium sulfate, titanium dioxide, zinc oxide, ceramic beads, and crystal beads.

One of or a plurality of those particulate fillers may be applied.

A preferable particulate filler for adhering on the outer surface of the shell of microspheres is one selected from organic compounds having a melting point not lower than 90° C. (or not lower than 100° C., preferably not lower than 110° C., more preferably not lower than 120° C., further preferably not lower than 150° C., and most preferably not lower than 200° C.), or one selected from inorganic compounds having a layered structure (preferably at least one selected from the group consisting of carbon black, molybdenum disulfide, tungsten disulfide, carbon fluoride, and boron nitride), in other words, an anti-blocking agent. The anti-blocking agent prevents the fusion of the resin forming the shell of the raw microspheres and/or heat-expanded microspheres, and further prevents the fusion of adjacent raw microspheres and/or heat-expanded microspheres in heating and expanding, and has a function which will not deteriorate the expanding performance of microspheres. Such performance of the anti-blocking agent enables heat-expanded microspheres, which are produced by expanding raw material microspheres and have re-expanding capacity, to immediately seal damage on tires and to supply internal pressure to damaged tires that have lost their internal pressure, when the heat-expanded microspheres are filled in a tire-and-rim assembly, and thus makes damaged tires runnable to a required distance as described below. A blowing agent containing fluorine compounds remarkably develops such effect.

Raw microspheres comprising a shell of thermoplastic resin produced by polymerizing a monomer mixture consisting essentially of a nitrile monomer and a monomer having a carboxyl group exhibit superior heat-resistance and flame-retardation (flameproof properties), and are processed into heat-expanded microspheres having the ability to re-expand at 90° C. or higher temperature (preferably at 100° C. or higher, and more preferably at 120° C. or higher), and exhibit the above-mentioned effects remarkably.

The average particle size of a particulate filler is preferably not greater than one tenth of the average particle size of the raw microspheres before adhering the particulate filler. The average particle size means an average particle size of the primary particles.

The amount of a particulate filler adhered on the raw microspheres is not particularly limited, and is preferably 0.1 to 95 weight percent of raw microspheres before adhering the filler, more preferably 0.5 to 60 weight percent, further preferably 5 to 50 weight percent, and most preferably 8 to 30 weight percent, considering the true specific gravity of heat-expandable microspheres and the optimization of the function of a particulate filler.

A particulate filler is adhered on the outer surface of raw microspheres by mixing raw microspheres and a particulate filler. The mixing process is not particularly limited, and a device equipped with simple tools, such as a vessel and paddle blades is employable. Ordinary powder mixers for shaking or agitating powders are also applicable. The examples of powder mixers are those which can shake and agitate, or agitate powders, such as ribbon-type mixers and vertical screw mixers. Recently, highly efficient multi-functional powder mixers manufactured by combining several agitation devices, such as Super Mixer (manufactured by Kawata MFG Co., Ltd.), High-Speed Mixer (manufactured by Fukae Co., Ltd.) and New-Gra Machine (manufactured by Seishin Enterprise Co., Ltd.), have become available.

Raw microspheres are applicable as a volume retention material, for example, by filling them in a tire-and-rim assembly and expanding with heating at a temperature not lower than the expansion initiating temperature of the raw material microspheres. In addition, raw microspheres may be applied as a lightweight filler for automobile paints, expanding particles in expandable inks for wall paper and apparel design, and an expanding material for lightening resin compositions.

b. Production Process for Heat-Expanded Microspheres

The first production process for the heat-expanded microspheres of the present invention comprises the step of feeding a gas fluid containing heat-expandable microspheres through a gas-introducing tube having a dispersion nozzle on its outlet and fixed inside a hot gas flow, and then jetting the gas flow from the dispersion nozzle (jetting step), wherein each of the heat-expandable microspheres comprises a shell of thermoplastic resin and a blowing agent encapsulated therein and has a boiling point not higher than the softening point of the thermoplastic resin and have an average particle size from 1 to 100 µm, colliding the gas fluid on a collision plate fixed on a downstream portion of the dispersion nozzle to disperse heat-expandable microspheres in the hot gas flow (dispersing step), and heating the dispersed heat-expandable microspheres in the hot gas flow at a temperature not lower than their expansion initiating temperature and thus expanding the heat-expandable microspheres (expanding step).

The production process is operated with production machines, for example, the machine having an expanding device as illustrated in FIG. 1.

The expanding device comprises a gas-introducing tube (not marked with a number) being equipped with a dispersion nozzle 4 on its outlet and fixed at the center of the device; a collision plate 5 fixed on a downstream side of the dispersion nozzle 4; a over-heating protection pipe 3 fixed around the gas-introducing tube at a proper distance; and a hot gas nozzle 1 fixed around the over-heating protection pipe 3 at a proper distance. At the expanding device, the gas fluid containing heat-expandable microspheres 6 runs through the gas-introducing tube in the direction shown with the arrow, and the gas flow 7 runs through the space between the gas-introducing tube and over-heating protection pipe 3 in the direction shown with the arrow, for improving the dispersion of heat-expandable microspheres and to protect the gas-introducing tube and the collision plate from excessive heating. Further, the hot gas flow 8 for heating and expanding runs through the space between the over-heating protection pipe 3 and the hot gas nozzle 1 in the direction shown with the arrow. The hot gas flow 8, gas fluid 6, and gas flow 7 do not necessarily flow in the same direction, though they usually flow in the same direction. In the over-heating protection pipe 3, the cooling medium 2 for cooling is made to flow in the direction shown with the arrow.

The gas-introducing tube and/or the collision plate 5 having the over-heating protection system is preferable for controlling the generation of aggregated or fused microspheres.

The shape of the collision plate is not particularly limited, and its form may be spindle-like, conical, pyramidal, spherical, or semi-spherical form, and a combination of those forms.

At the jetting step of the first production process, the gas fluid containing heat-expandable microspheres 6 is made to flow into the gas-introducing tube equipped with the dispersion nozzle 4 on its outlet and fixed inside the hot gas flow 8, and is jetted from the dispersion nozzle 4. The gas fluid containing heat-expandable microspheres 6 is not particularly limited, so long as it is a gas containing heat-expandable microspheres. Preferable gas fluids are those comprising inert gases, such as air, nitrogen, argon, and helium containing heat-expandable microspheres.

The moisture in the gas fluid 6 is preferably not more than 30 g/m$^3$, more preferably not more than 9.3 g/m$^3$, in order to prevent poor dispersion of heat-expandable microspheres.

The flow rate of the gas fluid 6 is preferably controlled at a rate at which each heat-expandable microsphere is subjected to the same heat history as far as possible, in order to be expanded in the subsequent dispersing step, though the rate is not particularly limited.

At the dispersing step of the first production process, the gas fluid 6 is collided with the collision plate 5 fixed under the dispersion nozzle 4 for dispersing heat-expandable microspheres uniformly in the hot gas flow 8. The gas fluid 6 coming out of the dispersion nozzle 4 is introduced to the collision plate 5 with the gas flow 7 and is collided with the plate.

The same gas as that for the gas fluid 6 is applicable for the gas flow 7.

At the expanding step of the first production process, dispersed heat-expandable microspheres are heated and expanded in the hot gas flow, 8, at a temperature not lower than the expansion initiating temperature of the microspheres. Then the heat-expanded microspheres are cooled down below the softening point of the thermoplastic resin forming the shell of the heat-expandable microspheres by feeding the heat-expanded microspheres through a cooling zone or with other measures, and the heat-expanded microspheres are collected.

Ordinary solid-gas separators, such as cyclone separators or bag filters, are preferable for the collection.

The second production process for the heat-expanded microspheres of the present invention comprises a step of jetting a gas fluid containing heat-expandable microspheres through at least one dispersion nozzle fixed outside hot gas flow (dispersing step), and dispersing the gas fluid in the hot gas flow, wherein each of the heat-expandable microspheres comprises a shell of thermoplastic resin and a blowing agent being encapsulated therein and having a boiling point not higher than the softening point of the thermoplastic resin and have an average particle size from 1 to 100 μm, and heating the dispersed heat-expandable microspheres in the hot gas flow at a temperature not lower than their expansion initiating temperature and thus expanding the heat-expandable microspheres (expanding step).

Figure 2:
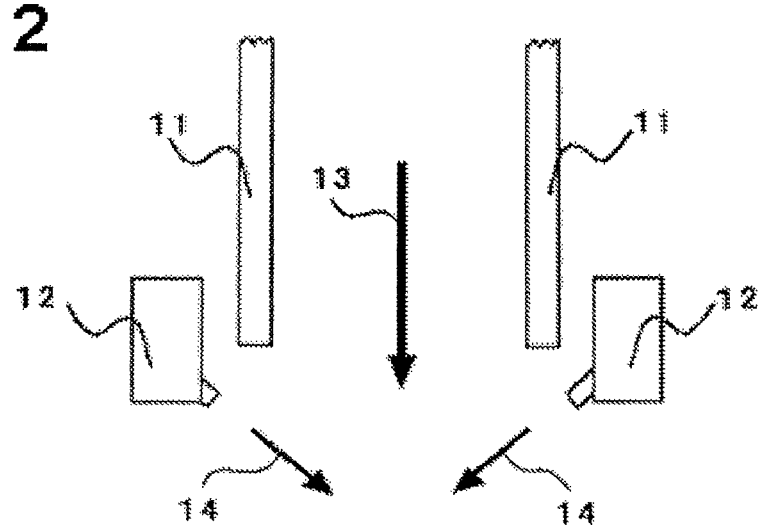
FIG. 2 is a diagram of the expanding device of the production machine employed in another production process of the present invention.

The production process is operated with production machines, for example, the machine having the expanding device as illustrated in FIG. 2.

The expanding device comprises the hot gas nozzle 11 fixed at the center of the device, and at least one dispersion nozzle 12 fixed around the bottom of the hot gas nozzle. At the expanding step, the hot gas flow 13 for expanding microspheres is fed through the hot gas nozzle 11 in the direction shown with the arrow, and the gas fluid containing heat-expandable microspheres 14 is fed through the dispersion nozzle 12 in the direction shown with the arrow. The gas fluid 14 may be fed almost orthogonally to the direction of the hot gas flow 13, though the direction of the gas fluid is usually slanted downward so as to not to feed the gas fluid orthogonally to the hot gas flow.

At the dispersing step of the second production process, the gas fluid containing heat-expandable microspheres 14 is jetted from at least one dispersion nozzle 12 fixed outside the hot gas flow 13, and heat-expandable microspheres are dispersed into the hot gas flow. The gas fluid 14 is the same as the gas fluid 6 mentioned above. The moisture content and flow rate of the gas fluid 14 may be controlled into the same as those of the gas fluid 6 mentioned above.

At the expanding step of the second production process, dispersed heat-expandable microspheres are heated and expanded in the hot gas flow 13 at a temperature not lower than the expansion initiating temperature of the microspheres. Then the heat-expanded microspheres are collected in the same manner as those of the first production process.

Adding a step for wetting heat-expanded microspheres with a liquid organic compound (wetting step) after the expanding step in the first and second production processes is preferable, because it prevents dust formation from heat-expanded microspheres and improves the dispersibility of heat-expanded microspheres in a mixing process in their application. Preferable liquid organic compounds may basically have the properties (1) and (2) described below, and may be selected according to the properties of the produced heat-expanded microspheres and the aim of their application, though the liquid organic compound is not particularly limited:

(1) a boiling point higher than the gasifying point of a blowing agent encapsulated in heat-expanded micro spheres (2) a wetting function that will not dissolve and swell thermoplastic resin which forms the shell of the heat-expanded microspheres The boiling point of the liquid organic compound ranges preferably from 80 to 270° C., more preferably from 90 to 260° C., and most preferably from 100 to 250° C., in order to meet the above requirement (1) and avoiding vaporization during storage.

Raw microspheres produced with the cross-linking agent described above contribute to improved solvent resistance of heat-expanded microspheres produced in the production process of the present invention. Such improved solvent resistance meets the above requirement (2) to expand the scope of the liquid organic compounds considerably.

The variants of the liquid organic compounds are not particularly limited. The examples of the liquid organic compounds are plasticizers, such as dibutyl phthalate, diisooctyl phthalate, dioctyl adipate, tricresyl phosphate, triethyl citrate, acetyltributyl citrate, and octyl alcohol, for applying resultant wet composition to plastics, elastomers, sealants, and paints; and monomers, such as dicyclopentane and styrene, for applying resultant wet composition to lightweight molded expanded products and adhesives. The examples of liquid organic compounds other than those mentioned above are nonionic surfactants, alkylene glycol, polyalkylene glycol, glycerin, silicone oil, liquid paraffin, and oils and fats. Two or more of those liquid organic compounds may be blended to be applied, and water is applicable instead of those liquid organic compounds.

The ratio between heat-expanded microspheres and a liquid organic compound (or water) is not particularly limited, and may be determined according to the surface property of heat-expanded microspheres and the extent of generated dust due to the true specific gravity of heat-expanded microspheres. Specifically, preferable ratios are those which decrease dust generation from heat-expanded microspheres to an indistinctive level. An excessive ratio of a liquid organic compound results in unevenly mixed liquid organic compound and heat-expanded microspheres due to excessive liquid organic compound in the mixture. For avoiding such mixture, the preferable ratio of a liquid organic compound is, for example, 90 parts by weight or less to 10 parts by weight of heat-expanded microspheres having a true specific gravity of 0.03 g/cc. On the other hand, insufficient ratio of a liquid organic compound is not preferable, because it leads to the generation of dust to a noticeable level.

At the wetting step, heat-expanded microspheres are shaken or agitated with a liquid organic compound. The shaking and agitating are performed with ordinary powder mixers, for example, mixers applicable to mixing heat-expandable microspheres and a particulate filler, and in addition operated with a dual-rotor mixer.

The wetting step is further described in detail, although the step is not restricted within the scope of the description. A predetermined amount of heat-expanded microspheres is placed in a device employed for the wetting step (hereinafter referred as wetting device), and a liquid organic compound (or water) is added. The liquid organic compound is discharged from one opening per 0.07 m² or wider area of the surface of heat-expanded microspheres to be shaken or agitated (for example, a flow rate not faster than 2 liters/min), and then the heat-expanded microspheres are shaken or agitated in the device until they are wet uniformly. The opening is fixed over the surface of microspheres or in the microspheres to be shaken or agitated. The area of the surface of microcapsules to be shaken or agitated per one opening should be controlled to make the liquid organic compound contact well with microspheres and to attain uniform wetting of whole of the microspheres, not to inhibit the movement of shaken or agitated heat-expanded microspheres due to the interference effect of a liquid organic compound discharged from a plurality of openings. The discharge rate of the liquid organic compound should be controlled in order to make it contact well with the shaken or agitated microspheres and to attain uniform wetting of all of the microspheres.

A movable opening which can move over the surface or inside of shaken or agitated microspheres is highly efficient, though the efficiency depends on its moving speed. For example, an opening movable at a rate of 20 cm/sec can discharge a liquid organic compound about 5 times of that discharged from a fixed opening, and shorten the shaking or agitating time required for uniform wetting after adding a liquid organic compound.

The opening may be simply an end of pipe or hose. Shower heads or spray nozzles may also be employed. A viscous liquid organic compound discharged with pressure and flowed into microspheres in cylindrical form does not scatter a lot of microspheres. A liquid sprayed with excessively high pressure scatters microspheres that are being shaken or agitated, and it requires the sealing of a wetting device or a dust collector.

After adding a liquid organic compound to heat-expanded microspheres, the microspheres are shaken or agitated until they are uniformly wet. The endpoint of the wetting is determined by picking up samples from a plurality of points in the wetting device, determining the true specific gravity of each 0.5 to 0.8 g of the samples with a liquid substitution method, and checking the deviation, for example, the standard deviation, of the values.

In the first or second production process, the preferable moisture content in heat-expandable microspheres is 5% or less, more preferably 3% or less, in order to attain uniform heating and expanding of the microspheres.

In the first or second production process, the expansion conditions can be controlled to produce heat-expanded microspheres having or not having a re-expansion initiating temperature. In the present invention, microspheres having a re-expansion initiating temperature are the same as the heat-expanded microspheres which have the capacity to re-expand with heating. The temperature at which the heat-expanded microspheres start to re-expand is referred as a re-expansion initiating temperature. Heat-expanded microspheres having a re-expansion initiating temperature are equal to the heat-expanded microspheres having an expansion coefficient greater than 100% at their maximum (re-)expanding temperature. On the other hand, microspheres having no re-expansion initiating temperature are equivalent to almost completely heat-expanded microspheres.

The expansion conditions are not particularly limited. For example, at first, microspheres are expanded with varied temperature levels of hot gas flow (hereinafter sometimes referred as "hot gas temperature"), while other conditions, such as the feeding rate of raw material, the flow rate of hot gas, and the amount of gas for dispersing raw material, are controlled to be constant. Then, the true specific gravity of expanded microspheres processed at each hot gas temperature level with other parameters controlled to be constant is determined. The hot gas temperature (x-axis) and true specific gravity (y-axis) are plotted and drawn into a graph. Heat-expandable microspheres having no re-expansion initiating temperature can be produced by controlling the hot gas temperature within the temperature range on the graph corresponding to the minimum true specific gravity of expanded microspheres (the minimum value in the graph).

For producing expanded microspheres having a prescribed true specific gravity, the hot gas temperature is controlled at the temperature corresponding to the required true specific gravity on the graph. Thus, the expansion conditions are controlled in order to produce heat-expanded microspheres having a prescribed re-expanding capacity.

In order to change the feeding rate of the raw material and/or the gas for dispersing the raw material, the hot gas temperature and other parameters are changed so as to control the expansion conditions, based on the consideration of the amount of heat supplied with the hot gas flow and the entire heat capacity of the raw material microspheres, and the heat-expandable microspheres. For example, the hot gas temperature is increased in order increase the feeding rate of raw material and the gas for dispersing the raw material. In order to decrease the feeding rate of the raw material and the gas for dispersing the raw material, the hot gas temperature is decreased.

In the first or second production processes, microspheres can be dispersed well and applied almost the same heat history to each of raw microspheres continuously owing to their high energy efficiency and easy temperature control. Thus, the difference in the coefficient of variation of particle size distribution of the microspheres before and after expansion is small, and the resultant heat-expanded microspheres have uniform qualities (especially particle size distribution and the distribution of true specific gravity). In other words, aggregated microspheres in the resultant heat-expanded microspheres are minimized, and the ratio of raw material and slightly expanded microspheres is also minimized.

The resultant heat-expanded microspheres are applied as a sealant for damaged tires, and/or an internal pressure supplier for damaged tires that have lost their internal pressure, by filling the same into a tire-and-rim assembly.

The sealant for damaged tires mentioned here means a sealant which can instantaneously seal the damaged portion of a tire with raw microspheres or heat-expanded microspheres that are transferred with a filled gas fluid so as to aggregate at the damaged portion when a tire is damaged and filled gas starts to leak through the damaged portion thereof. The internal pressure supplier is that which can increase the internal pressure of a damaged tire after the damage has been sealed with a sealant for damaged tires. Raw material microspheres or heat-expanded microspheres are rubbed together in the damaged tire, in which the volume of filled gas has decreased due to the deformation of the tire as a result of decreased internal pressure, and the temperature in the tire increases to the expansion initiating temperature of the microspheres so as to expand the microspheres, which subsequently function to increase the internal pressure of the damaged tire.

The temperature of heat-expanded microspheres filled in tires sometimes rises due to the contact between the microspheres or between the microspheres and the internal rubber surface of a tire, which is caused from the rotating motion of tires during driving of automobiles. If the temperature of heat-expanded microspheres rises above their expansion initiating temperature in running tires without damage, heat-expanded microspheres start to expand and may lose their performance for supplying internal pressure to damaged tires. In addition, the risk of losing the internal-pressure-supplying performance for damaged tires is higher in high-speed driving than in normal speed driving.

The heat-expanded microspheres produced in the production process of the present invention show satisfactory result when they are filled in tires and evaluated their running performance in driving with normal pressure and in high-speed driving with normal pressure as described below.

B. Heat-Expanded Microspheres

The heat-expanded microspheres of the present invention are those produced in the production process wherein heat-expandable microspheres comprising a shell of thermoplastic resin and a blowing agent with a boiling point not higher than the softening point of the thermoplastic resin being encapsulated in the shell, and having an average particle size ranging fro 1 to 100 μm are heated at their expansion initiating temperature or higher temperature. The raw heat-expandable microspheres mentioned here are preferably, but not being particularly limited, the heat-expandable microspheres described in the above "A. Production process of heat-expanded microspheres". The production process for heating and expanding heat-expandable microspheres at their expansion initiating temperature or higher temperature is preferably, but not particularly limited, the production process described in the above "A. Production process of heat-expanded microspheres".

The average particle size of heat-expanded microspheres is not particularly limited, and may be freely designed according to their application. For example, considering the retention of a blowing agent in shell and the durability of heat-expanded microspheres, a preferable average particle size ranges from 1 to 1000 μm, more preferably 5 to 800 μm, and most preferably 10 to 500 μm.

The ratio of aggregated microspheres in heat-expanded microspheres is preferably not higher than 5 weight percent, more preferably not more than 1 weight percent, further preferably not more than 0.5 weight percent, and most preferably not more than 0.3 weight percent, considering the uniformity of their true specific gravity. Aggregated microspheres are identified by visual inspection through electron microscope, and their quantity can be determined by measuring the residue from screening as precisely described in the examples below.

The ratio of microspheres having a true specific gravity not lower than 0.79 g/cc contained in heat-expanded microspheres at 25° C. is preferably not higher than 5 weight percent, more preferably not higher than 3 weight percent, further preferably not higher than 2 weight percent, and most preferably not higher than 1 weight percent, considering the uniformity of their true specific gravity. The ratio of microspheres having a true specific gravity not lower than 0.79 g/cc is determined by quantitative analysis of the precipitation remained after the separation by specific gravity with isopropyl alcohol (having a specific gravity of 0.79 at 25° C.).

The coefficient of variation, CV, of the particle size distribution of heat-expanded microspheres should not be much different from the CV of the particle size distribution of raw heat-expandable microspheres for maintaining the uniformity of particle size, and thus the difference in the CV of the particle size distribution of microspheres before and after heat-expansion is preferably within +/−10%, more preferably within +/−5%, further preferably within +/−3%, and most preferably within +/−1%. The difference in the coefficient of variation, CV, is defined as the difference obtained by subtracting the coefficient of variation of the particle size distribution of raw material heat-expandable microspheres from the coefficient of variation of the particle size distribution of resultant heat-expanded microspheres. The preferable coefficient of variation of the particle size distribution of heat-expanded microspheres is 30% or smaller, more preferably 27% or smaller, and most preferably 25% or smaller.

The heat-expanded microspheres of the present invention contain slight ratios of aggregated microspheres and microspheres having high true specific gravity, and the coefficient of variation in their particle size distribution is not much different from the coefficient of variation of their particle size distribution before heat-expansion.

The heat-expanded microspheres of the present invention may have or may not have a re-expansion initiating temperature.

The heat-expanded microspheres having a re-expansion initiating temperature have comparatively thick shell of thermoplastic resin, and are durable against external force. Such microspheres collapse minimally in mixing with a base component for producing porous material composition containing heat-expanded microspheres. In addition, such microspheres prevent porous molded products containing heat-expanded microspheres from time-dependent thermal deflation or hardening and shrinking. Heat-expanded microspheres having a re-expansion initiating temperature preferably have the property of the heat-expandable microspheres A described below.

The expansion coefficient of the heat-expanded microspheres of the present invention, in other words, the ratio of the volume of heat-expanded microspheres to their volume before heat-expanding, is not particularly limited, but preferably not smaller than 8 times, more preferably not smaller than 15 times, and most preferably not smaller than 30 times. The true specific gravity of heat-expanded microspheres is preferably, but not particularly limited, not greater than 0.30 g/cc, more preferably not greater than 0.25 g/cc, and most preferably not greater than 0.20 g/cc. The "true specific gravity" of heat-expanded microspheres in this specification means their "mean true specific gravity".

The retention of a blowing agent in the heat-expanded microspheres of the present invention is not particularly limited, but preferably not lower than 80%, more preferably not lower than 85%, and most preferably not lower than 90%, considering the amount of leaked blowing agent through shell, uniformity of their performance, and their stability.

For applying a fluorine compound as a blowing agent, the preferable retention is not lower than 90%, more preferably not lower than 95%, and most preferably not lower than 97%.

Keeping the heat-expanded microcapsules of the present invention in wet state with a liquid organic compound, which does not dissolve their shell, is preferable, because it prevents dust generation from the microspheres and improves the dispersibility of the microspheres in mixing for various applications. The variants and ratio of the liquid organic compound may be similar to those described in "A. Production process for heat-expanded microspheres."

A preferable blowing agent encapsulated in heat-expanded microspheres is, in particular, one containing a $C_{2-10}$ fluorine compound having ether structure and no chlorine or bromine atoms, as precisely described in "A. Production process for heat-expanded microspheres." Such blowing agent enables resultant heat-expanded microspheres being filled in a tire-and-rim assembly to exhibit superior performance for sealing damage on a tire and supplying internal pressure to a tire, when a tire is damaged to lose its internal pressure. In addition, such blowing agent brings satisfactory result in the evaluation of tire running performance with a normal internal pressure and high-speed tire running performance with a normal internal pressure. Further, such blowing agent enables to control the re-expansion initiating temperature of heat-expanded microspheres into a temperature preferably not lower than 90° C., more preferably not lower than 100° C., further preferably not lower than 110° C., and most preferably not lower than 120° C., and heat-expanded microcapsules having such re-expansion initiating temperature can be applied as a sealant for damage on tires and/or an internal pressure supplier for tires without restriction from the environment where tires are used.

The heat-expanded microspheres of the present invention may be applied as lightweight fillers for putty, paints, sealants, mortars, papier-mâché, and pottery, though such application is not particularly limited.

C. Heat-Expandable Microspheres A

The heat-expandable microspheres of the present invention (hereinafter sometimes referred to as "heat-expandable microspheres A") are novel heat-expanding microspheres comprising a shell of thermoplastic resin and a blowing agent being encapsulated in the shell and having a boiling point not higher than the softening point of the thermoplastic resin, and having the following properties (I) to (IV).

(I) an average particle size ranging from 1 to 1000 µm
(II) an expansion coefficient over 100% at a maximum expanding temperature
(III) a ratio of aggregated microspheres not higher than 5 weight percent
(IV) a ratio of microspheres having a true specific gravity not smaller than 0.79 g/cc at 25° C. not higher than 5 weight percent The heat-expandable microspheres A are produced by heating and expanding raw material microspheres to retain a capacity of re-expanding (in other words, to have a re-expansion initiating temperature) as in "A. Production process for heat-expanded microspheres". The expansion coefficient of the heat-expandable microspheres A is between the expansion coefficient of raw material microspheres at their maximum expanding temperature and the expansion coefficient of almost completely heat-expanded microspheres at their maximum expanding temperature. The same order would apply to their average particle sizes and true specific gravities.

The average particle size of the heat-expandable microspheres A is preferably 1 to 1000 µm, more preferably 5 to 800 µm, further preferably 10 to 500 µm, and most preferably 15 to 350 µm, considering the retention of a blowing agent in shell, degree of re-expanding, and durability of heat-expanded microspheres.

The expansion coefficient of the heat-expandable microspheres A at their maximum expanding temperature is over 100%, preferably over 105%, more preferably over 120%, further preferably over 130%, and most preferably over 150%, intending to produce heat-expandable microspheres without losing heat-expanding performance. The fact that the heat-expandable microspheres A have an expansion coefficient over 100% means almost the same fact that the heat-expandable microspheres A have an expansion initiating temperature, as described above.

The ratio of aggregated microspheres contained in the heat-expandable microspheres A should be not higher than 5 weight percent, preferably not higher than 1 weight percent, more preferably not higher than 0.5 weight percent, and most preferably not higher than 0.3 weight percent, considering the uniformity of the true specific gravity of the heat-expandable microspheres A. The existence of aggregated microspheres is identified in the process described above.

The ratio of microspheres having a true specific gravity not smaller than 0.79 g/cc at 25° C. contained in the heat-expandable microspheres A should be not higher than 5 weight percent, preferably not higher than 3 weight percent, more preferably not higher than 2 weight percent, and most preferably not higher than 1 weight percent, considering the uniformity of the true specific gravity of the heat-expandable microspheres A. The ratio of microspheres having a true specific gravity not smaller than 0.79 g/cc is determined by quantitative analysis of the precipitation remained after the separation by specific gravity with isopropyl alcohol (having a specific gravity of 0.79 at 25° C.).

Adhering a particulate filler on the outer surface of the shell of the heat-expandable microspheres A is preferable as explained in "A. Production process for heat-expanded microspheres". Dispersibility and flowability of the heat-expandable microspheres A are improved with the particulate filler. The same particulate fillers as mentioned above may be applied for the purpose. An average particle size of the particulate fillers is not particularly limited, but preferably not greater than 10 μm, more preferably not greater than 8 μm, and most preferably not greater than 5 μm.

Keeping the heat-expandable microspheres A in wet state with a liquid organic compound (or water) is preferable, as described above.

The heat-expandable microspheres A of the present invention contain slight ratios of aggregated microspheres and microspheres having a high true specific gravity. In addition, the heat-expandable microspheres A are durable against collapse by external force owing to their comparatively thick shell of thermoplastic resin. Thus the collapse of heat-expanded microspheres is minimized in mixing with a base component in a process for producing porous material composition containing heat-expanded microspheres. In addition, time-dependent thermal deflation and hardening or shrinking of porous molded products containing heat-expanded microspheres is prevented.

The heat-expandable microspheres A of the present invention are actually the same as the heat-expanded microspheres, which have a re-expansion initiating temperature and are included in the heat-expanded microspheres mentioned above, and applied to similar field to those for the heat-expanded microspheres.

D. Porous Material Composition and Porous Molded Products

The porous material composition of the present invention contains a base component and the heat-expanded microspheres and/or the heat-expandable microspheres A (hereinafter sometimes referred to simply as "microspheres (a)" instead of referring as "heat-expanded microspheres and/or heat-expandable microspheres A"). The microspheres (a) have comparatively thick shell of thermoplastic resin and resistant against collapse from external force in the preparation of porous material composition by blending and kneading several components. In addition, the microspheres (a) have a proper expanding performance to prevent hardening and shrinking of porous material composition in molding, and the resultant porous molded products are free from the troubles of time-dependent thermal deflation.

The heat-expanded microspheres and/or the heat-expandable microspheres A of the present invention are not particularly limited as long as they are the same as those described above, and preferable heat-expanded microspheres are those having a re-expanding capacity (in other words, having a re-expansion initiating temperature). In addition, microspheres containing lower ratio of aggregated microspheres are preferable. The ratio of aggregated microspheres is preferably not higher than 5 weight percent, more preferably not higher than 3 weight percent, and most preferably not higher than 2 weight percent, considering uniform dispersion of microspheres in a base component, surface finish of resultant porous molded products, and uniformity of their strength. Preferable coefficient of variation, CV, of their particle size distribution is not higher than 30%, more preferably not higher than 27%, and most preferably not higher than 25%.

The materials applicable as base components of porous material composition are, for example, organic materials, such as vinyl chloride resin, vinyl acetate resin, acrylic resin, ethylene vinyl acetate resin, epoxy resin, polyurethane, melamine resin, polyester, and silicone resin; and inorganic material, such as ceramic (clay) and cement; though it is not particularly limited. The liquid organic compounds described in the wetting step in the "A. Production process of heat-expanded microspheres" may be blended as the base component. At least one of those base components may be blended.

The ratio of the microsphere (a) in the whole of the porous material composition should be, but not particularly limited, preferably 0.1 to 30 weight percent, more preferably 0.3 to 25 weight percent, and most preferably 0.5 to 20 weight percent, considering their effect in the composition, lightweight effect, prevention of hardening and shrinking of products in molding, time-dependent thermal deflation of resultant porous molded products, and uniform mixing of porous material composition in production process.

Fillers conventionally employed for lightweight effect, such as perlite, flyash, sirasu-balloons, glass balloons, phenol balloons, carbon balloons, alumina balloons, and expanded styrene beads; reinforcing agents, such as glass fiber and aramid fiber; fillers, such as silica, talc, and calcium carbonate; and pigments, such as titanium oxide and magnesium oxide may be added to the porous material composition in addition to base components and the microsphere (a). At least one of those additives may be blended.

Fillers added in porous material composition are apt to cause a trouble of considerable collapse of heat-expanded microspheres or heat-expandable microspheres A due to external force in the production process of porous material composition. The comparatively thick shell of the microspheres contributes to decrease such collapse to great extent.

The production process of the porous material composition is not particularly limited, as long as the components are mixed. Examples of production devices include static mixers and dispersers.

The porous material composition may be employed for imparting lightweight effect to putty, paints, sealants, mortars, papier-mâché, and pottery.

The porous material composition produced in such process attain sufficient lightweight effect, prevents hardening and shrinking of products in molding, eliminating time-dependent thermal deflation of products, and contributes to the production of porous molded products of high dimensional stability. Porous molded products of inorganic materials may be baked to form separated bubbles in the molded inorganic products.

EXAMPLES

The present invention is described specifically with the following examples and comparative examples, though the present invention is not restricted within the scope of those examples.

Determination Procedures and Definition

[Determination of Average Particle Size and Particle Size Distribution]

A laser diffraction particle size analyzer (produced by SYMPATEC, HEROS & RODOS) was employed for the determination. Microspheres were analyzed in dry system with a dry dispersion unit, where a dispersion pressure was controlled at 5.0 bar and degree of vacuum was controlled at 5.0 mbar. The D50 value was determined as an average particle size.

[Determination of True Specific Gravity]

The true specific gravity of microspheres was determined with the liquid substitution method (Archimedean method) with isopropyl alcohol at 25° C.

[Determination of Ratio of Aggregated Microspheres]

The existence of aggregated microspheres was identified visually with electron microscope.

The ratio of aggregated microspheres contained in heat-expanded microspheres (heat-expandable microspheres A) was calculated from the amount of aggregated microspheres remained after screening heat-expanded microspheres (heat-expandable microspheres A) with a sieve of 2.0 R sieve opening, where R is the average particle size of screened microspheres, and 2.0 R is obtained by multiplying a value "a", which is greater than or equal to 1.95 and is less than 2.05, with R. If a sieve of 2.0 R sieve opening is not available, the ratio of the residue after screening with a sieve of a sieve opening ranging from 1.8 R to 2.0 R (except 2.0 R) and the ratio of the residue after screening with a sieve of a sieve opening ranging from 2.0 R to 2.2 R (except 2.0 R) are proportionally distributed and calculated to determine an amount equal to the ratio of the residue after screening with a sieve of 2.0 R sieve opening. For selecting each of sieves with a sieve opening ranging from 1.8 R to 2.0 R (except 2.0 R) and from 2.0 R to 2.2 R (except 2.0 R), a sieve having a sieve opening nearest to 2.0 R was selected. The amount of a sample screened with a sieve was not smaller than 1 liter.

[Determination of Moisture Content in Heat-Expandable Microspheres]

The moisture content was determined with a Karl Fischer moisture meter (MKA-510N, produced by Kyoto Electronics Manufacturing Co., Ltd.).

[Determination of Ratio of Blowing Agent Encapsulated in Heat-Expandable Microspheres]

One gram of heat-expandable microspheres was placed in a stainless steel evaporating dish 15 mm deep and 80 mm in diameter, and weighed out ($W_1$). Thirty milliliter of acetone was added to disperse the microspheres uniformly. After being left for 30 minutes at room temperature, the sample was dried at 120° C. for 2 hours, and the dry weight ($W_2$) was determined. The ratio of encapsulated blowing agent was calculated by the following expression.

Ratio of encapsulated blowing agent (%)=($W_1$-$W_2$) (g)/1.0(g)×100−(moisture content) (weight %)

(The moisture content in the expression was calculated as described above.)

[Determination of Retention of Encapsulated Blowing Agent]

The retention of an encapsulated blowing agent was the ratio between the ratio of an encapsulated blowing agent after expansion ($G_2$) and the ratio of an encapsulated blowing agent before expansion ($G_1$), and calculated by the following expression.

Retention of encapsulated blowing agent (%)=$G_2$/$G_1$×100

[Determination of (Re-)Expansion Initiating Temperature, Maximum (Re-)Expanding Temperature, and Expansion Coefficient at the Temperature]

Those properties were determined with DMA (DMA Q800, produced by TA Instruments). In an aluminum cup 4.8 mm in depth and 6.0 mm in diameter, 0.5 mg of heat-expandable microspheres (or heat-expanded microspheres) were placed, and an aluminum cover having 0.1 mm thickness and 5.6 mm in diameter was placed on the cup. The sample in the cup was subjected to a pressure of 0.01 N with a weight, and the height of the sample ($H_1$) was measured. The sample was then subjected to elevated temperature rising at a rate of 10° C./min in a range from 20 to 300° C., being subjected to a pressure of 0.01 N with the pressure, and the vertical change of the position of the press was determined. The temperature at which the press started to change its position was determined as a (re-) expansion initiating temperature, and the temperature at which the press indicated a highest position ($H_2$) was determined as the maximum (re-)expanding temperature. A (re-) expansion coefficient, at the maximum (re-) expanding temperature, E, was calculated by the following expression.

$E(\%) = H_2/H_1 \times 100$

[Volume Expansion Coefficient]

Volume expansion coefficient (A) was calculated by determining an average particle size ($R_1$) of heat-expandable microspheres before heat-expansion and an average particle size of heat-expandable microspheres ($R_2$), and by calculating the values by the following expression.

$A = (R_2/R_1)^3$ (times)

(Where $R_1$ is an average particle size of heat-expandable microspheres before heat-expansion, and $R_2$ is an average particle size of heat-expanded microspheres.)

[Evaluation of Running Performance of Tire Filled with Microcapsules with Normal Internal Pressure]

Heat-expandable microspheres (or heat-expanded microspheres) were filled in an assembly of a tire (with a size of 175/80R13, and a capacity of 21 liters) and a rim (with a size of 5J-13) to 80% of the capacity of the assembly, and the internal pressure of the tire was controlled at 200 kPa of gauge pressure with nitrogen. The tire was equipped to an automobile and was run at 60 km/hr for 30 minutes, and the expansion or shrinkage of the heat-expandable microspheres (or heat-expanded microspheres) was checked and evaluated. Expansion of microspheres was identified by measuring their particle size distribution. The difference in the average particle size of microspheres before and after the running was evaluated as ○ for a difference within +3%, and as X for a difference beyond +3%. The shrinkage of microspheres was identified and evaluated as ○ in the case that a difference in average particle size before and after the running was within −3%, and as X for a difference beyond −3%.

[Evaluation of High-Speed Running Performance of Tire Filled with Microcapsules with Normal Internal Pressure]

The evaluation was performed in the same manner as in the evaluation of running performance of tire filled with microcapsules with normal internal pressure, except that the running speed of an automobile was increased from 60 km/hr to 150 km/hr.

[Evaluation of Running Performance of Damaged Tire Filled with Microcapsules]

An automobile was driven for 30 minutes in the same manner as in the evaluation of running performance of tire filled with microcapsules with normal internal pressure, except that the running speed of an automobile was increased from 60 km/hr to 100 km/hr. Then the tire was run on a nail having 50 mm length and 3 mm in diameter to make the nail pierce into the tire. After checking that the internal pressure of the tire decreased to the atmospheric pressure, the automobile was run at 90 km/hr. The running performance was evaluated as X in the case that the automobile could run in a distance shorter than 80 km, as ○ in the case that the automobile could run in a distance from 80 to 150 km, and as ⊚ in the case that the automobile could run in a distance longer than 150 km.

[Determination of Specific Gravity of Paint]

The specific gravity of a paint was determined with a specific gravity cup (100 cc, produced by Ohira Rika Kogyo).

[Determination of Specific Gravity of Coating Film]

The specific gravity of a coating film was determined with a liquid substitution method (Archimedean method) with deionized water at 25° C.

Example A1

Heat-expanded microspheres were produced by heating and expanding MATSUMOTO MICROSPHERE F-50 (produced by Matsumoto Yushi-Seiyaku Co., Ltd., comprising of nitrile copolymer as thermoplastic resin shell, and isobutane as a blowing agent, with the average particle size of 20 μm, and the coefficient of variation of 35%) with the production machine equipped with the expanding device shown in FIG. 1.

The expansion conditions were controlled into 0.1 kg/h for raw material feeding rate, 0.03 $m^3$/min for flow rate of gas containing dispersed raw material, 0.5 $m^3$/min for flow rate of hot gas, and 130° C. for hot gas temperature.

The resultant heat-expanded microspheres had an average particle size of 83 μm, a coefficient of variation of 36%, a true specific gravity of 0.031 g/cc, and the volume expansion coefficient of 71.5. Microspheres having a true specific gravity not lower than 0.79 g/cc at 25° C. were not found in the resultant heat-expanded microspheres. No residues remained in each of the screening with the sieves of 150 μm sieve opening and 175 μm sieve opening. The ratio of aggregated microspheres calculated from the result of each screening with proportional distribution was 0 weight percent.

Comparative Example A1

MATSUMOTO MICROSPHERE F-50, applied in Example A1, was coated on a steel belt approximately in 2 mm thick. The steel belt was driven through a heating zone (at 130° C., 3 m long) and subsequent cooling zone (at 10° C., 2 m long) at a velocity of 1 m/min to produce heat-expanded microspheres.

The resultant heat-expanded microspheres had the average particle size of 86 μm, the coefficient of variation of 49%, the true specific gravity of 0.038 g/cc, and the cubic expansion coefficient of 79.5. In the resultant heat-expanded microspheres, 11 weight percent of microspheres having a true specific gravity not lower than 0.79 g/cc at 25° C. was found. The ratio of the residue after screening with the sieve of 150 μm sieve opening was 0.8 weight percent, and the ratio of the residues after screening with the sieves of 165 μm and 175 μm sieve opening was 0.5 weight percent and 0.4 weight percent, respectively. The ratio of aggregated microspheres calculated from those result with proportional distribution was 0.4 weight percent.

Example A2

Heat-expanded microspheres were produced in the same manner as in Example A1, except that the heat-expandable microspheres, MATSUMOTO MICROSPHERE F-50, were replaced with MATSUMOTO MICROSPHERE F-100 (produced by Matsumoto Yushi-Seiyaku Co., Ltd., comprising of nitrile copolymer as thermoplastic resin shell, and isopentane as a blowing agent, with the average particle size of 25 μm and the coefficient of variation of 37%), and that the hot gas temperature was controlled at 180° C.

The resultant heat-expanded microspheres had the average particle size of 97 μm, the coefficient of variation of 36%, the true specific gravity of 0.028 g/cc, and the cubic expansion coefficient of 58.4. Microspheres having a true specific gravity not lower than 0.79 g/cc at 25° C. were not found in the resultant heat-expanded microspheres. No residue was remained in the screening with the sieve of 200 μm sieve opening. No residue was remained in each of the screening with the sieve of 175 μm sieve opening and with the sieve of 210 μm sieve opening. The ratio of aggregated microspheres calculated from those results with proportional distribution was 0 weight percent.

Comparative Example A2

Heat-expanded microspheres were produced in the same manner as in Comparative Example A1, except that MATSUMOTO MICROSPHERE F-50 was replaced with MATSUMOTO MICROSPHERE F-100 and that the heating zone temperature was controlled at 180° C.

The resultant heat-expanded microspheres had the average particle size of 100 μm, the coefficient of variation of 45%, the true specific gravity of 0.030 g/cc, and the cubic expansion coefficient of 64.0. In the resultant heat-expanded microspheres, 0.3 weight percent of aggregated microspheres and 15 weight percent of microspheres having a true specific gravity not lower than 0.79 g/cc at 25° C. were found. The amount of aggregated microspheres was determined with the sieve of 200 μm sieve opening.

Example A3

Heat-expanded microspheres were produced in the same manner as in Example A1, except that the heat-expandable microspheres, MATSUMOTO MICROSPHERE F-50, were replaced with a trial product 1 of heat-expandable microspheres (comprising of nitrile copolymer as thermoplastic resin shell, and isohexane as a blowing agent, with the average particle size of 35 μm and the coefficient of variation of 20%), and the hot gas temperature was controlled at 240° C.

The resultant heat-expanded microspheres had the average particle size of 130 μm, the coefficient of variation of 20%, the true specific gravity of 0.021 g/cc, and the cubic expansion coefficient of 51.1. Microspheres having a true specific gravity not lower than 0.79 g/cc at 25° C. were not found in the resultant heat-expanded microspheres. No residue was remained in the screening with the sieve of 200 μm sieve opening. No residue was remained in each of the screening with the sieves of 235 μm sieve opening and 275 μm sieve opening. The ratio of aggregated microspheres calculated from those results with proportional distribution was 0 weight percent.

Comparative Example A3

Heat-expanded microspheres were produced in the same manner as in Comparative Example A1, except that MATSUMOTO MICROSPHERE F-50 was replaced with the trial product 1 of heat-expandable microspheres described in Example A3 and that the heating zone temperature was controlled at 240° C.

The resultant heat-expanded microspheres had the average particle size of 100 μm, the coefficient of variation of 31%, the true specific gravity of 0.030 g/cc, and the cubic expansion coefficient of 66.6. The resultant heat-expanded microspheres contained 5.6 weight percent of aggregated microspheres and 12 weight percent of microspheres having a true specific gravity not lower than 0.79 g/cc at 25° C. The amount of aggregated microspheres was determined with the sieve of 200 μm sieve opening.

Example A4

The trial product 1 of heat-expandable microspheres described in Example A3 and ultrafine powder talc (produced by Nihon Talc Co., Ltd, with a trade name, SG-1000, with the average particle size of 2.0 μm) was mixed in 6:4 weight ratio uniformly with a Super Mixer (manufactured by Kawata MFG Co., Ltd.) to produced heat-expandable microspheres with outer surface on which the ultrafine powder talc was adhered.

Heat-expanded microspheres were produced in the same manner as in Example A1, except that the heat-expandable microspheres, MATSUMOTO MICROSPHERE F-50, were replaced with the heat-expandable microspheres with outer surface on which ultrafine powder talc was adhered and the hot gas temperature was controlled at 240° C.

The resultant heat-expanded microspheres had the average particle size of 124 μm, the coefficient of variation of 21%, the true specific gravity of 0.026 g/cc, and the cubic expansion coefficient of 44.4. Microspheres having a true specific gravity not lower than 0.79 g/cc at 25° C. were not found in the resultant heat-expanded microspheres. No residue was remained in the screening with the sieve of 200 μm sieve opening. No residue was remained in each of the screening with the sieves of 225 μm sieve opening and 250 μm sieve opening. The ratio of aggregated microspheres calculated from those results with proportional distribution was 0 weight percent.

Example B1

Heat-expanded microspheres were produced by thermally expanding MATSUMOTO MICROSPHERE F-50 (produced by Matsumoto Yushi-Seiyaku Co., Ltd., comprising of nitrile copolymer as thermoplastic resin shell, and isobutane as a blowing agent, with the average particle size of 20 μm and the coefficient of variation of 35%) with the production machine equipped with the expanding device shown in FIG. 2.

The expanding parameters were controlled into 0.1 kg/h for raw material feeding rate, 0.05 m³/min for flow rate of gas containing dispersed raw material, 1.0 m³/min for flow rate of hot gas, and 140° C. for hot gas temperature.

The resultant heat-expanded microspheres had the average particle size of 98 μm, the coefficient of variation of 36%, the true specific gravity of 0.022 g/cc, and the cubic expansion coefficient of 117.6. Microspheres having a true specific gravity not lower than 0.79 g/cc at 25° C. were not found in the resultant heat-expanded microspheres. No residue was remained in the screening with the sieve of 150 μm sieve opening. No residue was remained in each of the screening with the sieves of 180 μm sieve opening and 200 μm sieve opening. The ratio of aggregated microspheres calculated from the result of each screening with proportional distribution was 0 weight percent.

Comparative Example B1

MATSUMOTO MICROSPHERE F-50, applied in Example B1, was coated on a steel belt approximately in 2 mm thick. The steel belt was driven through a heating zone (at 130° C., 3 m long) and subsequent cooling zone (at 10° C., 2 m long) at a velocity of 1 m/min to produce heat-expanded microspheres.

The resultant heat-expanded microspheres had the average particle size of 102 μm, the coefficient of variation of 48%, the true specific gravity of 0.020 g/cc, and the cubic expansion coefficient of 132.7. In the resultant heat-expanded microspheres, 12 weight percent of microspheres having a true specific gravity not lower than 0.79 g/cc at 25° C. was found. The ratio of the residue after screening with the sieve of 150 μm sieve opening was 1.8 weight percent, and the ratio of the residue after each of the screening with the sieves of 165 μm sieve opening and 175 μm sieve opening was 0.8 weight percent and 0.5 weight percent, respectively. The ratio of aggregated microspheres calculated from those result with proportional distribution was 0.7 weight percent.

Example B2

Heat-expanded microspheres were produced in the same manner as in Example B1, except that the heat-expandable microspheres, MATSUMOTO MICROSPHERE F-50, were replaced with MATSUMOTO MICROSPHERE F-100 (produced by Matsumoto Yushi-Seiyaku Co., Ltd., comprising of nitrile copolymer as thermoplastic resin shell, and isopentane as a blowing agent, with the average particle size of 25 μm and the coefficient of variation of 37%), and that the hot gas temperature was controlled at 170° C.

The resultant heat-expanded microspheres had the average particle size of 93 μm, the coefficient of variation of 38%, the true specific gravity of 0.033 g/cc, and the cubic expansion coefficient of 51.5. Microspheres having a true specific gravity not lower than 0.79 g/cc at 25° C. were not found in the resultant heat-expanded microspheres. No residue was remained in each of the screening with the sieves of 175 μm sieve opening and 200 μm sieve opening. The ratio of aggregated microspheres calculated from those results with proportional distribution was 0 weight percent.

Comparative Example B2

Heat-expanded microspheres were produced in the same manner as in Comparative Example B1, except that MATSUMOTO MICROSPHERE F-50 was replaced with MATSUMOTO MICROSPHERE F-100 and that the heating zone temperature was controlled at 170° C.

The resultant heat-expanded microspheres had the average particle size of 85 μm, the coefficient of variation of 48%, the true specific gravity of 0.040 g/cc, and the cubic expansion coefficient of 39.3. The resultant heat-expanded microspheres contained 14 weight percent of microspheres having a true specific gravity not lower than 0.79 g/cc at 25° C. The ratio of the residue after screening with the sieve of 200 μm sieve opening was 0.8 weight percent, and the ratio of the residue after each of the screening with the sieves of 165 μm sieve opening and 175 μm sieve opening was 2.5 weight percent and 1.8 weight percent, respectively. The ratio of aggregated microspheres calculated from those results with proportional distribution was 2.2 weight percent.

Example B3

Heat-expanded microspheres were produced in the same manner as in Example B1, except that the heat-expandable microspheres, MATSUMOTO MICROSPHERE F-50, were replaced with the trial product 1 of heat-expandable microspheres (comprising of nitrile copolymer as thermoplastic resin shell, and isohexane as a blowing agent, having the average particle size of 35 μm and the coefficient of variation of 20%), and the hot gas temperature was controlled at 230° C.

The resultant heat-expanded microspheres had the average particle size of 120 μm, the coefficient of variation of 21%, the true specific gravity of 0.027 g/cc, and the cubic expansion coefficient of 40.3. Microspheres having a true specific gravity not lower than 0.79 g/cc at 25° C. were not found in the resultant heat-expanded microspheres. No residue was remained in the screening with the sieve of 200 μm sieve opening. No residue was remained in each of the screening with the sieves of 225 μm sieve opening and 250 μm sieve opening. The ratio of aggregated microspheres calculated from those results with proportional distribution was 0 weight percent.

Comparative Example B3

Heat-expanded microspheres were produced in the same manner as in Comparative Example B1, except that MATSU-MOTO MICROSPHERE F-50 was replaced with the trial product 1 of heat-expandable microspheres described in Example B3 and that the heating zone temperature was controlled at 230° C.

The resultant heat-expanded microspheres had the average particle size of 117 μm, the coefficient of variation of 31%, the true specific gravity of 0.031 g/cc, and the cubic expansion coefficient of 37.3. The resultant heat-expanded microspheres contained 15 weight percent of microspheres having a true specific gravity not lower than 0.79 g/cc at 25° C. The ratio of the residue after screening with the sieve of 200 μm sieve opening was 6.6 weight percent, and the ratio of the residue after each of the screening with the sieves of 215 μm sieve opening and 250 μm sieve opening was 5.6 weight percent and 3.2 weight percent, respectively. The ratio of aggregated microspheres calculated from those results with proportional distribution was 4.3 weight percent.

Example B4

Heat-expandable microspheres were produced by uniformly blending the trial product 1 of heat-expandable microspheres described in Example B3 and ultrafine powder talc (produced by Nihon Talc Co., Ltd., with a trade name, SG-1000, having an average particle size of 2.0 μm) in a 6:4 weight ratio with a Super Mixer (manufactured by Kawata MFG Co., Ltd.) to adsorb ultrafine powder talc on the outer surface of the heat-expandable microspheres.

Heat-expanded microspheres were produced in the same manner as in Example B1, except that MATSUMOTO MICROSPHERE F-50 were replaced with the heat-expandable microspheres with outer surface on which ultrafine powder talc was adhered, and the hot gas temperature was controlled at 230° C.

The resultant heat-expanded microspheres had the average particle size of 119 μm, the coefficient of variation of 21%, the true specific gravity of 0.029 g/cc, and the cubic expansion coefficient of 39.3. Microspheres having a true specific gravity not lower than 0.79 g/cc at 25° C. were not found in the resultant heat-expanded microspheres. No residue was remained in the screening with the sieve of 200 μm sieve opening. No residue was remained in each of the screening with the sieves of 225 μm sieve opening and 250 μm sieve opening. The ratio of aggregated microspheres calculated from those results with proportional distribution was 0 weight percent.

Example C1

An aqueous phase was prepared by adding 150 g of sodium chloride, 3.0 g of an adipic acid-diethanolamine condensate, 20 g of colloidal silica (20% concentration), and 0.15 g of sodium nitrite to 500 g of deionized water, and by homogenizing the mixture with agitation.

An oily phase was prepared by mixing 180 g of acrylonitrile, 45 g of methacrylonitrile, 75 g of methacrylic acid, 1.2 g of trimethylolpropane trimethacrylate, 2.0 g of azobisisobutyronitrile, and 150 g of $C_3F_7OCH_3$, and agitating to dissolve the ingredients.

Then the aqueous phase and the oily phase were mixed preliminarily with a homogenizer at 3,000 rpm for 2 minutes, and then agitated at 10,000 rpm for 2 minutes to prepare a suspension. Then, the suspension was transferred into a reactor, purged with nitrogen, and polymerized at 61° C. for 20 hours with agitation. The polymerization product was filtered and dried. The resultant microspheres had an average particle size of 25 μm, a CV or coefficient of variation of 24%, an expansion initiating temperature of 143° C., and the maximum expanding temperature of 205° C.

The ratio of the blowing agent encapsulated in the heat-expandable microspheres was determined to be 31.8 weight percent.

The microspheres did not burn when a source of ignition was brought close to them.

The resultant heat-expandable microspheres were processed into heat-expanded microspheres by heating and expanding with the production machine equipped with the expanding device shown in FIG. 1.

Some of the expanding parameters were controlled constant, 1.0 kg/h for the raw material feeding rate, 0.05 m³/min for the flow rate of gas containing dispersed raw material, and 0.5 m³/min for the flow rate of hot gas, while the hot gas temperature was controlled into varied levels, 300° C., 350° C., 400° C., 450° C., and 500° C., as shown in Table 1.

The properties of the resultant heat-expanded microspheres (heat-expandable microspheres) were evaluated and the results were described in Table 1.

TABLE 1

| | Hot gas temperature | | | | |
|---|---|---|---|---|---|
| | 300° C. | 350° C. | 400° C. | 450° C. | 500° C. |
| Sample number | No. 1 | No. 2 | No. 3 | No. 4 | No. 5 |
| Average particle size (μm) | 74.8 | 89.5 | 111 | 124 | 136 |
| Coefficient of variation, CV (%) | 24 | 24 | 25 | 24 | 25 |
| Ratio of encapsulated blowing agent (%) | 31.5 | 31.5 | 31.2 | 30.9 | 31.0 |
| Retention of encapsulated blowing agent (%) | 99.0 | 98.4 | 98.1 | 97.3 | 97.5 |
| True specific gravity (g/cc) | 0.046 | 0.028 | 0.014 | 0.010 | 0.008 |
| Ratio of microspheres having a true specific gravity not lower than 0.79 g/cc (weight percent) | 1.1 | 0.8 | 0.4 | 0.4 | 0.4 |

TABLE 1-continued

|  | Hot gas temperature | | | | |
| --- | --- | --- | --- | --- | --- |
|  | 300° C. | 350° C. | 400° C. | 450° C. | 500° C. |
| Opening of Sieve 1 (μm)/ratio of aggregated microspheres in the screening (weight percent) | 150/0 | 175/0 | 200/0 | 250/0 | 270/0 |
| Opening of Sieve 2 (μm)/ratio of aggregated microspheres in the screening (weight percent) | — | 185/0 | 225/0 | — | 280/0 |
| Ratio of aggregated microspheres (weight percent) | 0 | 0 | 0 | 0 | 0 |
| (Re—) Expansion initiating temperature (° C.) | 131 | 132 | 131 | 132 | 133 |
| Maximum (re-) expanding temperature (° C.) | 203 | 202 | 202 | 202 | 202 |
| (Re—) Expansion coefficient (%) | 240 | 211 | 160 | 120 | 101 |
| Running performance of microsphere-filled tire with normal internal pressure at driving | ○ | ○ | ○ | ○ | ○ |
| Running performance of microsphere-filled tire with normal internal pressure at high speed driving | ○ | ○ | ○ | ○ | ○ |
| Running performance of damaged microsphere-filled tire | ◎ | ◎ | ○ | ○ | ○ |

As clearly shown in the result in Table 1, the heat-expandable microspheres produced in this Example exhibited superior performance in the evaluation of the running performance with normal internal pressure, the running performance with normal internal pressure at high speed, and the running performance of damaged tire, when they were filled in a tire-and-rim assembly.

Comparative Example C1

The heat-expandable microspheres produced in Example C1 was processed into heat-expanded microspheres with heating for 1 minute in an oven (produced by Sanyo Electric Co.,), with hot gas temperature being controlled at different levels, 140° C., 160° C., 180° C., 200° C., and 220° C., as described in Table 2.

The properties of the resultant heat-expanded microspheres (heat-expandable microspheres) were evaluated and described in Table 2.

As clearly shown in the result in Table 2, the heat-expandable microspheres, which were produced in this Comparative Example, exhibited superior performance in the evaluation of the running performance with normal internal pressure but exhibited poor performance in the evaluation of the running performance with normal internal pressure at high speed, when they were filled in a tire-and-rim assembly. The cause of the poor performance is estimated to be the high ratio of microspheres having a true specific gravity not lower than 0.79 g/cc.

As clearly shown in the comparison of the ratio of aggregated microspheres in the microspheres of Example C1 and Comparative Example C1, conventional expanding processes, such as heating in an oven, cannot process heat-expandable microspheres with uniform particle size distribution, which are employed as raw material microspheres, into heat-expanded microspheres with uniform particle size distribution containing no aggregated microspheres.

Example C2

The polymerization was performed in the same manner as in Example C1 except that 150 g of $C_3F_7OCH_3$ (with the

TABLE 2

|  | Hot gas temperature | | | | |
| --- | --- | --- | --- | --- | --- |
|  | 140° C. | 160° C. | 180° C. | 200° C. | 220° C. |
| Sample number | No. 6 | No. 7 | No. 8 | No. 9 | No. 10 |
| Average particle size (μm) | 89.6 | 104 | 126 | 148 | 169 |
| Coefficient of variation, CV (%) | 27 | 25 | 24 | 24 | 25 |
| Ratio of encapsulated blowing agent (%) | 31.5 | 31.2 | 31.1 | 30.3 | 29.9 |
| Retention of encapsulated blowing agent (%) | 99.2 | 98.2 | 97.8 | 95.3 | 94.1 |
| True specific gravity (g/cc) | 0.083 | 0.038 | 0.029 | 0.015 | 0.011 |
| Ratio of microspheres having a true specific gravity not lower than 0.79 g/cc (weight percent) | 23.1 | 18.7 | 8.9 | 7.5 | 6.9 |
| Opening of Sieve 1 (μm)/ratio of aggregated microspheres in the screening (weight percent) | 175/1.0 | 200/2.7 | 250/3.2 | 300/6.9 | 330/11.3 |
| Opening of Sieve 2 (μm)/ratio of aggregated microspheres in the screening (weight percent) | 185/0.7 | 215/1.2 | — | — | 350/2.5 |
| Ratio of aggregated microspheres (weight percent) | 0.9 | 2.3 | 3.2 | 6.9 | 7.8 |
| (Re—) Expansion initiating temperature (° C.) | 178 | 179 | 178 | 179 | 178 |
| Maximum (re-) expanding temperature (° C.) | 223 | 223 | 222 | 223 | 223 |
| (Re—) Expansion coefficient (%) | 209 | 167 | 142 | 134 | 120 |
| Running performance of microsphere-filled tire with normal internal pressure at driving | ○ | ○ | ○ | ○ | ○ |
| Running performance of microsphere-filled tire with normal internal pressure at high speed driving | X | X | X | X | X |
| Running performance of damaged microsphere-filled tire | ○ | ○ | ○ | X | X | specific gravity of 1.41) was replaced with 65 g of normal pentane (with the specific gravity of 0.63).

The resultant heat-expandable microspheres had the average particle size of 30 μm, the CV or coefficient of variation of 33%, the expansion initiating temperature of 155° C., and the maximum expanding temperature of 189° C. The ratio of the blowing agent encapsulated in the heat-expandable microspheres was determined to be 16.6 weight percent.

The microspheres burnt when a source of ignition was brought close to them, and thus the evaluation of the microspheres being filled in a tire-and-rim assembly was abandoned.

The resultant heat-expandable microspheres were processed into heat-expanded microspheres by heating and expanding with the production machine equipped with the expanding device shown in FIG. 1. Some of the expanding parameters were controlled constant, 1.0 kg/h for the raw material feeding rate, 0.05 m³/min for the flow rate of gas containing dispersed raw material, and 0.5 m³/min for the flow rate of hot gas, while the hot gas temperature was controlled into varied levels, 300° C., 350° C., 400° C., 450° C., and 500° C. The properties of the resultant heat-expanded microspheres (heat-expandable microspheres) were evaluated and described in Table 3.

Comparative Example C2

The polymerization was performed in the same manner as in Example C1 except that 75 g of methacrylic acid was replaced with 75 g of vinyl acetate.

The resultant heat-expandable microspheres had the average particle size of 27 μm, the CV or coefficient of variation of 25%, the expansion initiating temperature of 95° C., and the maximum expanding temperature of 157° C. The ratio of the blowing agent encapsulated in the heat-expandable microspheres was determined to be 30.9 weight percent. The microspheres did not burn when a source of ignition was brought close to them.

The heat-expandable microspheres produced above was processed into heat-expanded microspheres with heating for 1 minute with an oven (produced by Sanyo Electric Co.,),

TABLE 3

|  | Hot gas temperature | | | | |
| --- | --- | --- | --- | --- | --- |
|  | 300° C. | 350° C. | 400° C. | 450° C. | 500° C. |
| Sample number | No. 11 | No. 12 | No. 13 | No. 14 | No. 15 |
| Average particle size (μm) | 75.4 | 84.1 | 107 | 137 | 122 |
| Coefficient of variation, CV (%) | 34 | 33 | 33 | 34 | 36 |
| Ratio of encapsulated blowing agent (%) | 14.7 | 13.3 | 12.9 | 11.2 | 8.9 |
| Retention of encapsulated blowing agent (%) | 88.3 | 80.1 | 77.8 | 67.4 | 53.6 |
| True specific gravity (g/cc) | 0.066 | 0.045 | 0.022 | 0.010 | 0.015 |
| Ratio of microspheres having a true specific gravity not lower than 0.79 g/cc (weight percent) | 4.2 | 3.5 | 3.4 | 3.1 | 2.5 |
| Opening of Sieve 1 (μm)/ratio of aggregated microspheres in the screening (weight percent) | 150/0 | 150/0.5 | 215/0.1 | 275/0.3 | 225/3.3 |
| Opening of Sieve 2 (μm)/ratio of aggregated microspheres in the screening (weight percent) | — | 175/0.1 | — | — | 250/1.0 |
| Ratio of aggregated microspheres (weight percent) | 0 | 0.2 | 0.1 | 0.3 | 1.4 |
| (Re—) Expansion initiating temperature (° C.) | 133 | 132 | 132 | 133 | none |
| Maximum (re-) expanding temperature (° C.) | 188 | 187 | 188 | 186 | none |
| (Re—) Expansion coefficient (%) | 180 | 148 | 121 | 101 | none | with hot gas temperature being controlled at different levels, 110° C., 130° C., 150° C., 170° C., and 190° C. as described in Table 4. The properties of the resultant heat-expanded microspheres (heat-expandable microspheres) were evaluated and described in Table 4.

TABLE 4

|  | Hot gas temperature | | | | |
| --- | --- | --- | --- | --- | --- |
|  | 110° C. | 130° C. | 150° C. | 170° C. | 190° C. |
| Sample number | No. 16 | No. 17 | No. 18 | No. 19 | No. 20 |
| Average particle size (μm) | 80.1 | 93.2 | 119 | 133 | 154 |
| Coefficient of variation, CV (%) | 25 | 24 | 25 | 26 | 25 |
| Ratio of encapsulated blowing agent (%) | 29.5 | 29.3 | 28.8 | 28.8 | 28.6 |
| Retention of encapsulated blowing agent (%) | 95.4 | 94.7 | 93.3 | 93.1 | 92.6 |
| True specific gravity (g/cc) | 0.048 | 0.032 | 0.016 | 0.011 | 0.017 |
| Ratio of microspheres having a true specific gravity not lower than 0.79 g/cc (weight percent) | 13.4 | 9.9 | 8.3 | 7.9 | 6.1 |
| Opening of Sieve 1 (μm)/ratio of aggregated microspheres in the screening (weight percent) | 150/6.3 | 185/5.9 | 225/7.5 | 265/6.8 | 300/8.9 |

TABLE 4-continued

| | Hot gas temperature | | | | |
|---|---|---|---|---|---|
| | 110° C. | 130° C. | 150° C. | 170° C. | 190° C. |
| Opening of Sieve 2 (μm)/ratio of aggregated microspheres in the screening (weight percent) | 175/3.8 | — | 250/4.8 | — | 350/5.9 |
| Ratio of aggregated microspheres (weight percent) | 5.3 | 5.9 | 6.1 | 6.8 | 8.1 |
| (Re—) Expansion initiating temperature (° C.) | 83 | 83 | 82 | none | none |
| Maximum (re-) expanding temperature (° C.) | 145 | 146 | 146 | none | none |
| (Re—) Expansion coefficient (%) | 197 | 138 | 106 | none | none |
| Running performance of microsphere-filled tire with normal internal pressure | X | X | X | X | X |
| Running performance of microsphere-filled tire with normal internal pressure at high speed | X | X | X | X | X |
| Running performance of damaged microsphere-filled tire | ○ | X | X | X | X |

As clearly shown in the result in Table 4, the heat-expandable microspheres produced in this Comparative Example exhibited poor performance in the evaluation of the running performance with normal internal pressure and the running performance with normal internal pressure at high speed, though they exhibited proper performance in the evaluation of the running performance of damaged tire in some cases, when they were filled in a tire-and-rim assembly. The cause of the poor performance is estimated as that the temperature of the heat-expandable microspheres in a tire may have reached to their (re-) expansion initiating temperature during the tire was running.

Example C3

The polymerization was performed in the same manner as in Example C1 except that the oily medium was prepared by mixing 235 g of acrylonitrile, 60 g of methacrylonitrile, 5.0 g of methyl methacrylate, 1.2 g of ethyleneglycol dimethacrylate, 2.0 g of azobisisobutyronitrile, and 150 g of $C_3HF_6OCH_3$.

The resultant microspheres had the average particle size of 42 μm, the CV or coefficient of variation of 26%, the expansion initiating temperature of 140° C., and the maximum expanding temperature of 198° C.

The ratio of the blowing agent encapsulated in the heat-expandable microspheres was determined to be 32.9 weight percent. The microspheres did not burn when a source of ignition was brought close to them.

The resultant heat-expandable microspheres were processed into heat-expanded microspheres by heating and expanding with the production machine equipped with the expanding device shown in FIG. 1. Some of the expanding parameters were controlled constant, 1.0 kg/h for the raw material feeding rate, 0.05 m³/min for the flow rate of gas containing dispersed raw material, and 0.5 m³/min for the flow rate of hot gas, while the hot gas temperature was controlled into varied levels, 250° C., 300° C., 350° C., 400° C., and 450° C. as shown in Table 5. The properties of the resultant heat-expanded microspheres (heat-expandable microspheres) were evaluated and described in Table 5.

TABLE 5

| | Hot gas temperature | | | | |
|---|---|---|---|---|---|
| | 250° C. | 300° C. | 350° C. | 400° C. | 450° C. |
| Sample number | No. | No. | No. | No. | No. |
| Average particle size (μm) | 108 | 122 | 139 | 166 | 183 |
| Coefficient of variation, CV (%) | 25 | 26 | 25 | 25 | 27 |
| Ratio of encapsulated blowing agent (%) | 32.0 | 31.5 | 31.7 | 31.3 | 31.1 |
| Retention of encapsulated blowing agent (%) | 97.2 | 95.8 | 96.3 | 95.3 | 94.4 |
| True specific gravity (g/cc) | 0.072 | 0.051 | 0.034 | 0.020 | 0.014 |
| Ratio of microspheres having a true specific gravity not lower than 0.79 g/cc (weight percent) | 1.2 | 0.8 | 0.6 | 0.4 | 0.2 |
| Opening of Sieve 1 (μm)/ratio of aggregated microspheres in the screening (weight percent) | 215/0 | 225/0 | 270/0 | 330/0 | 350/0 |
| Opening of Sieve 2 (μm)/ratio of aggregated microspheres in the screening (weight percent) | — | 250/0 | 280/0 | — | 370/0 |
| Ratio of aggregated microspheres (weight percent) | 0 | 0 | 0 | 0 | 0 |
| (Re—) Expansion initiating temperature (° C.) | 96 | 96 | 95 | 95 | 96 |
| Maximum (re-) expanding temperature (° C.) | 197 | 197 | 198 | 197 | 196 |
| (Re—) Expansion coefficient (° C.) | 240 | 218 | 202 | 147 | 113 |
| Running performance of microsphere-filled tire with normal internal pressure | ○ | ○ | ○ | ○ | ○ |
| Running performnance of microsphere-filled tire with normal internal pressure at high speed driving | X | X | X | X | X |
| Running performance of damaged microsphere-filled tire | ◎ | ◎ | ○ | ○ | ○ |

As clearly shown in the result in Table 5, the heat-expandable microspheres produced in this Example exhibited superior performance in the evaluations of the running performance with normal internal pressure and the running performance of damaged tire, when they were filled in a tire-and-rim assembly.

Comparative Example C3

The polymerization was performed in the same manner as in Example C3 except that 5.0 g of methyl methacrylate was replaced with 5.0 g of methacrylic acid The resultant heat-expandable microspheres had the average particle size of 40 μm, the CV or coefficient of variation of 26%, the expansion initiating temperature of 143° C., and the maximum expanding temperature of 199° C. The ratio of the blowing agent encapsulated in the heat-expandable microspheres was determined to be 31.8 weight percent. The microspheres did not burn when a source of ignition was brought close to them.

The heat-expandable microspheres produced in the above was processed into heat-expanded microspheres with heating for 1 minutes with an oven (produced by Sanyo Electric Co.,), with hot gas temperature being controlled at different levels, 120° C., 140° C., 160° C., 180° C., and 200° C. as described in Table 6. The properties of the resultant heat-expanded microspheres (heat-expandable microspheres) were evaluated and described in Table 6.

though they exhibited superior performance in the evaluation of the running performance with normal internal pressure, and the running performance of damaged tire, when they were filled in a tire-and-rim assembly.

Example C4

Heat-expandable microspheres with outer surface on which magnesium stearate was adhered were produced by blending 500 g of the heat-expandable microspheres produced in Example C1 and 100 g of magnesium stearate (having an average particle size of 2.0 μm and a melting point of 132° C.) with a Super Mixer (manufactured by Kawata MFG Co., Ltd.) for 30 minutes.

The resultant heat-expandable microspheres had the average particle size of 24.9 μm and the CV or coefficient of variation of 25%. The ratio of the blowing agent encapsulated in the heat-expandable microspheres was determined to be 30.4 weight percent.

The resultant heat-expandable microspheres were processed into heat-expanded microspheres by heating and expanding with the production machine equipped with the expanding device shown in FIG. 1. Some of the expanding parameters were controlled constant, 1.0 kg/h for the raw material feeding rate, 0.05 m$^3$/min for the flow rate of gas containing dispersed raw material, and 0.5 m$^3$/min for the flow rate of hot gas, while the hot gas temperature was con-

TABLE 6

| | Hot gas temperature | | | | |
|---|---|---|---|---|---|
| | 120° C. | 140° C. | 160° C. | 180° C. | 200° C. |
| Sample number | No. 26 | No. 27 | No. 28 | No. 29 | No. 30 |
| Average particle size (μm) | 98.9 | 124 | 144 | 167 | 189 |
| Coefficient of variation, CV (%) | 26 | 26 | 27 | 27 | 26 |
| Ratio of encapsulated blowing agent (%) | 29.6 | 29.5 | 29.3 | 28.7 | 28.7 |
| Retention of encapsulated blowing agent (%) | 93.1 | 92.9 | 92.1 | 90.4 | 90.2 |
| True specific gravity (g/cc) | 0.086 | 0.044 | 0.028 | 0.018 | 0.013 |
| Ratio of microspheres having a true specific gravity not lower than 0.79 g/cc (weight percent) | 8.9 | 7.3 | 6.3 | 5.9 | 5.1 |
| Opening of Sieve 1 (μm)/ratio of aggregated microspheres in the screening (weight percent) | 200/0 | 250/0.3 | 280/3.3 | 330/3.8 | 385/5.1 |
| Opening of Sieve 2 (μm)/ratio of aggregated microspheres in the screening (weight percent) | — | — | 300/0.9 | 350/0.4 | — |
| Ratio of aggregated microspheres (weight percent) | 0 | 0.3 | 2.3 | 3.1 | 5.1 |
| (Re—) Expansion initiating temperature (° C.) | 98 | 98 | 99 | 98 | 97 |
| Maximum (re-) expanding temperature (° C.) | 199 | 199 | 201 | 199 | 197 |
| (Re—) Expansion coefficient (%) | 232 | 206 | 198 | 138 | 107 |
| Running performance of microsphere-filled tire with normal internal pressure | ○ | ○ | ○ | ○ | ○ |
| Running performance of microsphere-filled tire with normal internal pressure at high speed driving | X | X | X | X | X |
| Running performance of damaged microsphere-filled tire | ◎ | ◎ | ○ | ○ | ○ |

As clearly shown in the result in Table 6, the heat-expandable microspheres produced in this Comparative Example exhibited poor performance in the evaluation of the running performance with normal internal pressure at high speed, trolled into varied levels, 300° C., 350° C., 400° C., 450° C., and 500° C. as shown in Table 7. The properties of the resultant heat-expanded microspheres (heat-expandable microspheres) were evaluated and described in Table 7.

TABLE 7

| | Hot gas temperature | | | | |
|---|---|---|---|---|---|
| | 300° C. | 350° C. | 400° C. | 450° C. | 500° C. |
| Sample number | No. 31 | No. 32 | No. 33 | No. 34 | No. 35 |
| Average particle size (μm) | 72.1 | 87.4 | 107 | 118 | 131 |
| Coefficient of variation, CV (%) | 24 | 24 | 25 | 24 | 25 |

TABLE 7-continued

|  | Hot gas temperature | | | | |
| --- | --- | --- | --- | --- | --- |
|  | 300° C. | 350° C. | 400° C. | 450° C. | 500° C. |
| Ratio of encapsulated blowing agent (%) | 29.7 | 29.4 | 29.4 | 29.0 | 29.1 |
| Retention of encapsulated blowing agent (%) | 97.8 | 96.6 | 96.6 | 95.4 | 95.7 |
| True specific gravity (g/cc) | 0.047 | 0.029 | 0.016 | 0.011 | 0.009 |
| Ratio of microspheres having a true specific gravity not lower than 0.79 g/cc (weight percent) | 1.2 | 1.1 | 0.8 | 0.6 | 0.5 |
| Opening of Sieve 1 (μm)/ratio of aggregated microspheres in the screening (weight percent) | 140/0 | 175/0 | 215/0 | 215/0 | 250/0 |
| Opening of Sieve 2 (μm)/ratio of aggregated microspheres in the screening (weight percent) | 150/0 | — | — | 250/0 | 270/0 |
| Ratio of aggregated microspheres (weight percent) | 0 | 0 | 0 | 0 | 0 |
| (Re—) Expansion initiating temperature (° C.) | 130 | 133 | 132 | 131 | 133 |
| Maximum (re-) expanding temperature (° C.) | 202 | 203 | 202 | 201 | 202 |
| (Re—) Expansion coefficient (%) | 238 | 222 | 156 | 116 | 103 |
| Running performance of microsphere-filled tire with normal internal pressure | ○ | ○ | ○ | ○ | ○ |
| Running performance of microsphere-filled tire with normal internal pressure at high speed driving | ○ | ○ | ○ | ○ | ○ |
| Running performance of damaged microsphere-filled tire | ◎ | ◎ | ◎ | ◎ | ○ |

As clearly shown in the result in Table 7, the heat-expandable microspheres produced in this Example exhibited superior performance in the evaluation of the running performance with normal internal pressure, the running performance with normal internal pressure at high speed, and the running performance of damaged tire, when they were filled in a tire-and-rim assembly. The running performance of damaged tire was especially better than the running performance of damaged tire in Example C1 owing to the effect of the anti-blocking agent.

Example C5

Heat-expandable microspheres with outer surface on which carbon black was adhered were produced by blending 500 g of the heat-expandable microspheres produced in Example C1 and 100 g of carbon black (acetylene black having the average particle size of 42 nm) with a Super Mixer (manufactured by Kawata MFG Co., Ltd.) for 30 minutes.

The resultant heat-expandable microspheres had the average particle size of 24.7 μm and the CV or coefficient of variation of 26%. The ratio of the blowing agent encapsulated in the heat-expandable microspheres was determined to be 30.8 weight percent.

The resultant heat-expandable microspheres were processed into heat-expanded microspheres by heating and expanding with the production machine equipped with the expanding device shown in FIG. 1. Some of the expanding parameters were controlled constant, 1.0 kg/h for the raw material feeding rate, 0.05 m³/min for the flow rate of gas containing dispersed raw material, and 0.5 m³/min for the flow rate of hot gas, while the hot gas temperature was controlled into varied levels, 300° C., 350° C., 400° C., 450° C., and 500° C. as shown in Table 8. The properties of the resultant heat-expanded microspheres (heat-expandable microspheres) were evaluated and described in Table 8.

TABLE 8

|  | Hot gas temperature | | | | |
| --- | --- | --- | --- | --- | --- |
|  | 300° C. | 350° C. | 400° C. | 450° C. | 500° C. |
| Sample number | No. 36 | No. 37 | No. 38 | No. 39 | No. 40 |
| Average particle size (μm) | 73.1 | 88.6 | 109 | 121 | 134 |
| Coefficient of variation, CV (%) | 25 | 25 | 26 | 26 | 25 |
| Ratio of encapsulated blowing agent (%) | 30.1 | 30.0 | 29.5 | 29.6 | 29.2 |
| Retention of encapsulated blowing agent (%) | 97.8 | 97.4 | 95.9 | 96.2 | 94.7 |
| True specific gravity (g/cc) | 0.048 | 0.032 | 0.015 | 0.012 | 0.007 |
| Ratio of microspheres having a true specific gravity not lower than 0.79 g/cc (weight percent) | 1.3 | 1.0 | 0.9 | 0.5 | 0.6 |
| Opening of Sieve 1 (μm)/ratio of aggregated microspheres in the screening (weight percent) | 140/0 | 175/0 | 215/0 | 215/0 | 250/0 |
| Opening of Sieve 2 (μm)/ratio of aggregated microspheres in the screening (weight percent) | 150/0 | — | — | 250/0 | 270/0 |
| Ratio of aggregated microspheres (weight percent) | 0 | 0 | 0 | 0 | 0 |
| (Re—) Expansion initiating temperature (° C.) | 130 | 133 | 132 | 131 | 133 |
| Maximum (re-) expanding temperature (° C.) | 202 | 203 | 202 | 201 | 202 |
| (Re—) Expansion coefficient (%) | 239 | 225 | 163 | 118 | 101 |
| Running performance of microsphere-filled tire with normal internal pressure | ○ | ○ | ○ | ○ | ○ |
| Running performance of microsphere-filled tire with normal internal pressure at high speed driving | ○ | ○ | ○ | ○ | ○ |
| Running performance of damaged microsphere-filled tire | ◎ | ◎ | ◎ | ◎ | ○ |

As clearly shown in the result in Table 8, the heat-expandable microspheres produced in this Example exhibited superior performance in the evaluation of the running performance with normal internal pressure, the running performance with normal internal pressure at high speed, and the running performance of damaged tire, when they were filled in a tire-and-rim assembly. The running performance of damaged tire was especially better than the running performance of damaged tire of the Example C1 owing to the effect of the anti-blocking agent.

Example C6

The polymerization was performed in the same manner as in Example C1 except that the oily medium was prepared by mixing 120 g of acrylonitrile, 30 g of methacrylonitrile, 150 g of methacrylic acid, 1.2 g of trimethylolpropane trimethacrylate, 2.0 g of azobisisobutyronitrile, and 150 g of $C_2HF_4OC_2H_2F_3$.

The resultant microspheres had the average particle size of 29 μm, the CV or coefficient of variation of 23%, the expansion initiating temperature of 183° C., and the maximum expanding temperature of 230° C. The ratio of the blowing agent encapsulated in the heat-expandable microspheres was determined to be 32.5 weight percent. The microspheres did not burn when a source of ignition was brought close to them.

The resultant heat-expandable microspheres were processed into heat-expanded microspheres by heating and expanding with the production machine equipped with the expanding device shown in FIG. 2, which is described in "Production process of heat-expanded microspheres". Some of the expanding parameters were controlled constant, 1.0 kg/h for the raw material feeding rate, 0.05 m³/min for the flow rate of gas containing dispersed raw material, and 0.5 m³/min for the flow rate of hot gas, while the hot gas temperature was controlled into varied levels, 400° C., 450° C., 500° C., 550° C., and 600° C. as shown in Table 9. The properties of the resultant heat-expanded microspheres (heat-expandable microspheres) were evaluated and described in Table 9.

As clearly shown in the result in Table 9, the heat-expandable microspheres produced in this Example exhibited superior performance in the evaluations of the running performance with normal internal pressure, the running performance with normal internal pressure at high speed, and the running performance of damaged tire, when they were filled in a tire-and-rim assembly.

Example C7

The polymerization was performed in the same manner as in Example C1 except that the oily medium was prepared by mixing 72 g of acrylonitrile, 18 g of methacrylonitrile, 210 g of methacrylic acid, 1.2 g of trimethylolpropane trimethacrylate, 2.0 g of azobisisobutyronitrile, and 150 g of $C_4F_9OCH_3$.

The resultant microspheres had the average particle size of 36 μm, the CV or coefficient of variation of 23%, the expansion initiating temperature of 188° C., and the maximum expanding temperature of 232° C. The ratio of the blowing agent encapsulated in the heat-expandable microspheres was determined to be 32.7 weight percent. The microspheres did not burn when a source of ignition was brought close to them.

The resultant heat-expandable microspheres were processed into heat-expanded microspheres by heating and expanding with the production machine equipped with the expanding device shown in FIG. 2. Some of the expanding parameters were controlled constant, 1.0 kg/h for the raw material feeding rate, 0.05 m³/min for the flow rate of gas containing dispersed raw material, and 0.5 m³/min for the flow rate of hot gas, while the hot gas temperature was controlled into varied levels, 400° C., 450° C., 500° C., 550° C., and 600° C. as shown in Table 10. The properties of the resultant heat-expanded microspheres (heat-expandable microspheres) were evaluated and described in Table 10.

TABLE 9

|  | Hot gas temperature | | | | |
| --- | --- | --- | --- | --- | --- |
|  | 400° C. | 450° C. | 500° C. | 550° C. | 600° C. |
| Sample number | No. 41 | No. 42 | No. 43 | No. 44 | No. 45 |
| Average particle size (μm) | 78.9 | 95.1 | 107 | 120 | 137 |
| Coefficient of variation, CV (%) | 24 | 23 | 23 | 24 | 23 |
| Ratio of encapsulated blowing agent (%) | 32.1 | 32.0 | 32.0 | 32.0 | 31.9 |
| Retention of encapsulated blowing agent (%) | 98.9 | 98.5 | 98.5 | 98.5 | 98.2 |
| True specific gravity (g/cc) | 0.063 | 0.036 | 0.025 | 0.018 | 0.012 |
| Ratio of microspheres having a true specific gravity not lower than 0.79 g/cc (weight percent) | 1.9 | 1.3 | 0.9 | 0.6 | 0.3 |
| Opening of Sieve 1 (μm)/ratio of aggregated microspheres in the screening (weight percent) | 150/0 | 185/0 | 215/0 | 225/0 | 270/0 |
| Opening of Sieve 2 (μm)/ratio of aggregated microspheres in the screening (weight percent) | 175/0 | 200/0 | — | 250/0 | — |
| Ratio of aggregated microspheres (weight percent) | 0 | 0 | 0 | 0 | 0 |
| (Re—) Expansion initiating temperature (° C.) | 175 | 173 | 174 | 174 | 176 |
| Maximum (re-) expanding temperature (° C.) | 227 | 227 | 228 | 229 | 227 |
| (Re—) Expansion coefficient (%) | 238 | 207 | 163 | 132 | 104 |
| Running performance of microsphere-filled tire with normal internal pressure | ◯ | ◯ | ◯ | ◯ | ◯ |
| Running performance of microsphere-filled tire with normal internal pressure at high speed driving | ◯ | ◯ | ◯ | ◯ | ◯ |
| Running performance of damaged microsphere-filled tire | ◎ | ◎ | ◯ | ◯ | ◯ |

TABLE 10

|  | Hot gas temperature | | | | |
| --- | --- | --- | --- | --- | --- |
|  | 400° C. | 450° C. | 500° C. | 550° C. | 600° C. |
| Sample number | No. 46 | No. 47 | No. 48 | No. 49 | No. 50 |
| Average particle size (μm) | 89.6 | 104 | 126 | 148 | 169 |
| Coefficient of variation, CV (%) | 23 | 22 | 23 | 23 | 23 |
| Ratio of encapsulated blowing agent (%) | 31.6 | 31.8 | 31.7 | 31.1 | 30.5 |
| Retention of encapsulated blowing agent (%) | 96.6 | 97.2 | 96.8 | 95.2 | 93.3 |
| True specific gravity (g/cc) | 0.079 | 0.032 | 0.024 | 0.017 | 0.012 |
| Ratio of microspheres having a true specific gravity not lower than 0.79 g/cc (weight percent) | 2.1 | 1.3 | 0.4 | 0.7 | 0.4 |
| Opening of Sieve 1 (μm)/ratio of aggregated microspheres in the screening (weight percent) | 175/0 | 200/0 | 250/0 | 300/0 | 330/0 |
| Opening of Sieve 2 (μm)/ratio of aggregated microspheres in the screening (weight percent) | 185/0 | 215/0 | — | — | 350/0 |
| Ratio of aggregated microspheres (weight percent) | 0 | 0 | 0 | 0 | 0 |
| (Re—) Expansion initiating temperature (° C.) | 178 | 179 | 178 | 179 | 180 |
| Maximum (re-) expanding temperature (° C.) | 223 | 223 | 222 | 223 | 225 |
| (Re—) Expansion coefficient (%) | 236 | 218 | 164 | 104 | 101 |
| Running performance of microsphere-filled tire with normal internal pressure | ○ | ○ | ○ | ○ | ○ |
| Running performnance of microsphere-filled tire with normal internal pressure at high speed driving | ○ | ○ | ○ | ○ | ○ |
| Running performance of damaged microsphere-filled tire | ⊚ | ⊚ | ○ | ○ | ○ |

As clearly shown in the result in Table 10, the heat-expandable microspheres produced in this Example exhibited superior performance in the evaluations of the running performance with normal internal pressure, the running performance with normal internal pressure at high speed, and the running performance of damaged tire, when they were filled in a tire-and-rim assembly.

Comparative Example C4

The polymerization was performed in the same manner as that in Example C1 except that an oily medium was prepared by mixing 24 g of acrylonitrile, 6.0 g of methacrylonitrile, 270 g of methacrylic acid, 1.2 g of trimethylolpropane trimethacrylate, 2.0 g of azobisisobutyronitrile, and 150 g of $C_4F_9OCH_3$.

The resultant microspheres had the average particle size of 31 μm and the CV or coefficient of variation of 26%, and did not have expanding performance.

Example D1

A base paint was prepared by mixing 100 g of polyvinyl chloride (SUMILIT PCX, produced by Sumitomo-Chemical Co., Ltd., with the softening point of 80° C.), 100 g of limestone powder (WHITON SB, produced by Shiraishi Calcium Kaisha, Ltd., with the average particle size of 2.2 μm), 50 g of soft calcium carbonate (light calcium carbonate, produced by Konoshima Chemical Co., Ltd., with the average particle size of 0.3 μm), 120 g of a plasticizer (SANSO CIZER DINP, a phthalic ester plasticizer, produced by New Japan Chemical Co., Ltd.), and 10 g of a solvent (mineral spirit, produced by Nippon Oil Corporation) with a grain mixer.

A lightweight paint (with a specific gravity of 0.90) was prepared by blending 1.0 g of the heat-expanded microspheres produced in Example B3 and 99 g of the base paint. The heat-expanded microspheres had a re-expanding capacity with the maximum re-expanding temperature of 196° C. and the re-expansion coefficient of 180%. The resultant lightweight paint was subjected to the pressure of 15 MPa at room temperature for the predetermined periods described in Table 11 below, and the specific gravity of the treated lightweight paint was determined. Then the treated lightweight paint was coated on a 7-mm thick iron plate in 2 mm thick coating, and baked at 140° C. for 30 minutes in an oven to be processed into coating film, and the specific gravity of the coating film was determined. The baked coating film was baked again at 170° C. for 30 minutes in an oven, and the specific gravity of the re-baked coating film was determined. The result is shown in Table 11.

TABLE 11

|  | Pressing time (min) | | | | |
| --- | --- | --- | --- | --- | --- |
|  | 0 | 30 | 60 | 90 | 120 |
| Specific gravity of pressed paint | 0.90 | 0.91 | 0.92 | 0.91 | 0.93 |
| Specific gravity of baked paint | 0.90 | 0.92 | 0.94 | 0.94 | 0.95 |
| Specific gravity of re-baked paint | 0.90 | 0.92 | 0.93 | 0.94 | 0.94 |

Comparative Example D1

A lightweight paint (with the specific gravity of 0.94) was prepared in the same manner as in Example D1, except that the heat-expanded microspheres produced in Comparative Example B3 were blended instead of the heat-expanded microspheres produced in Example B3.

The property of the lightweight paint was determined in the same manner as in Example D1. The result is shown in Table 12.

TABLE 12

|  | Pressing time (min) | | | | |
| --- | --- | --- | --- | --- | --- |
|  | 0 | 30 | 60 | 90 | 120 |
| Specific gravity of pressed paint | 0.94 | 0.99 | 1.05 | 1.16 | 1.24 |
| Specific gravity of baked paint | 0.96 | 1.03 | 1.13 | 1.21 | 1.28 |
| Specific gravity of re-baked paint | 1.10 | 1.13 | 1.21 | 1.27 | 1.29 |

In Example D1, the specific gravity of the paint hardly changed with the increase of pressing time. On the contrary, in Comparative Example D1, the specific gravity of the paint increased with the increase of pressing time due to the increase of collapsed heat-expanded microspheres by external force. In Example D1, almost no difference was found in the specific gravity between baked coating film and re-baked coating film, and no thermal deflation was observed. On the contrary, in Comparative Example D1, a significant difference was found in the specific gravity between baked coating film and re-baked coating film, and thermal deflation was observed.

INDUSTRIAL APPLICABILITY

The production process for heat-expanded microspheres of the present invention produces heat-expanded microspheres having a particle size distribution with minimum difference in its coefficient of variation before and after heat-expansion and containing slight ratios of aggregated microspheres and microspheres of high true specific gravity.

The heat-expanded microspheres of the present invention have a property of containing slight ratios of aggregated microspheres and microspheres of high true specific gravity. The heat-expanded microspheres are durable against collapse by external force, and the property enables the heat-expanded microspheres to prevent hardening and shrinking of a porous material composition when they are blended in the composition for lightweight effect, and to solve time-dependent thermal degradation of porous molded products produced from the porous material composition.

The heat-expandable microsphere A of the present invention are durable against collapse by external force, and the property enables the heat-expandable microspheres to prevent hardening and shrinking of a porous material composition when they are blended in the composition for lightweight effect, and to solve time-dependent thermal degradation of porous molded products produced from the porous material composition.

The porous molded products of the present invention are produced with sufficient lightweight effect, do not harden or shrink in molding, do not cause time-dependent thermal deflation, and have high dimensional stability.

The heat-expanded microspheres and heat-expandable microspheres A of the present invention containing a specific fluorine compound as a blowing agent exhibit satisfactory performance for sealing damage on tires and supplying internal pressure to tires, when they are filled in a tire-and-rim assembly as a sealant for damage on tires and an internal pressure supplier for tires.

The heat-expandable microspheres of the present invention containing a specific fluorine compound as a blowing agent are processed as the raw material for the heat-expanded microspheres and heat-expandable microspheres A, and the microspheres produced from the heat-expandable microspheres exhibit satisfactory performance for sealing damage on tires and supplying internal pressure to tires, when they are filled in a tire-and-rim assembly as a sealant for damage on tires and an internal pressure supplier for fires. The heat-expandable microspheres attain satisfactory result in the evaluation of not only the tire running performance with normal internal pressure, but also the high-speed tire running performance with normal internal pressure.

What is claimed is:

1. A method of producing heat-expanded microspheres, which comprises the steps of:
   providing a plurality of heat-expandable microspheres, each heat-expandable microsphere comprising a shell of thermoplastic resin, and a blowing agent encapsulated therein having a boiling point not higher than the softening point of the thermoplastic resin, and the plurality of heat-expandable microsphere having an average particle size from 1 to 100 µm;
   feeding a gas fluid containing the plurality of heat-expandable microspheres through a gas-introducing tube which has a dispersion nozzle on an outlet thereof, the dispersion nozzle being fixed inside a conduit with a hot gas flow flowing through the conduit, and then jetting the gas fluid from the dispersion nozzle;
   colliding the gas fluid with a collision plate fixed on a downstream portion of the dispersion nozzle in order to disperse the plurality of heat-expandable microspheres in the hot gas flow; and
   heating the plurality of dispersed heat-expandable microspheres in the hot gas flow at a temperature not lower than the expansion initiating temperature of the plurality of heat-expandable microspheres and thus expanding the same.

2. A method of producing heat-expanded microspheres according to claim 1, wherein the gas-introducing tube and/or collision plate is provided with an overheating prevention function.

3. A method of producing heat-expanded microspheres, comprising the steps of:
   providing a plurality of heat-expandable microspheres, each heat-expandable microsphere comprising a shell of thermoplastic resin, and a blowing agent encapsulated therein having a boiling point not higher than the softening point of the thermoplastic resin, the plurality of heat-expandable microspheres having an average particle size from 1 to 100 µm;
   jetting a gas fluid containing the plurality of heat-expandable microspheres through at least one dispersion nozzle fixed outside a hot gas flow, and dispersing the gas fluid in the hot gas flow; and
   heating the plurality of dispersed heat-expandable microspheres in the hot gas flow at a temperature not lower than the expansion initiating temperature of the plurality of heat-expandable microspheres to thereby expand the same.

4. A method of producing heat-expanded microspheres according to claim 1, wherein each of the plurality of heat expandable microspheres further comprises a particulate filler that adheres to the outer surface of the shell thereof, the particulate filler having an average particle size not greater than one tenth of the average particle size of the plurality of heat-expandable microspheres without the particulate filler adhered to the surface thereof.

5. A method of producing heat-expanded microspheres according to claim 1, which further comprises the step of wetting the resultant plurality of heat-expanded microspheres with a liquid organic compound which does not dissolve the shells thereof.

6. A method of producing heat-expanded microspheres according to claim 1, wherein the expansion conditions of the plurality of heat-expandable microspheres are controlled in such a manner that the plurality of heat-expanded microspheres do not have a re-expansion initiating temperature.

7. A method of producing heat-expanded microspheres according to claim 1, wherein the expansion conditions of the plurality of heat-expandable microspheres are controlled in such a manner that the plurality of heat-expanded microspheres have a re-expansion initiating temperature.

8. A method of producing heat-expanded microspheres according to claim 1, wherein the blowing agent contains a $C_{2-10}$ fluorine compound having an ether structure, and which contains no chlorine and bromine atoms.

9. A method of producing heat-expanded microspheres according to claim 8, wherein the thermoplastic resin is produced by polymerizing a monomer mixture consisting essentially of a nitrile monomer and a monomer having a carboxyl group, the weight ratio of the nitrile monomer ranging from 20 to 80 weight percent of the monomer mixture, and the weight ratio of the monomer having a carboxyl group ranging from 80 to 20 weight percent.

10. A method of producing heat-expanded microspheres according to claim 8, wherein each of the plurality of heat-expandable microspheres further comprise a particulate filler that adheres to the outer surface of the shells thereof, the particulate filler having an average particle size not greater than one tenth of the average particle size of the plurality of heat-expandable microspheres without the particulate filler adhered to the surface thereof, and is at least one anti-blocking agent selected from the group consisting of organic compounds having a melting point not lower than 90° C. and inorganic compounds having a layered structure.

11. Heat-expanded microspheres produced by a method in which heat expandable microspheres having an average particle size ranging from 1 to 100 μm, and which each comprise a shell of thermoplastic resin, and a blowing agent having a boiling point not higher than the softening point of the thermoplastic resin and encapsulated in the shell, are heated to a temperature not lower than an expansion initiating temperature of the heat-expandable microspheres to thereby expand the heat-expandable microspheres, wherein the heat-expanded microspheres contain not more than 5 weight percent of aggregated microspheres and not more than 5 weight percent of microspheres having a true specific gravity not lower than 0.79 g/cc at 25° C.

12. Heat-expanded microspheres according to claim 11, wherein the heat-expandable microspheres further comprise a particulate filler that adheres to the outer surface of the shells thereof, the particulate filler having an average particle size not greater than one tenth of the average particle size of the heat-expandable microspheres without the particulate filler adhered to the surface thereof.

13. Heat-expanded microspheres according to claim 11, which are produced by heating and expanding the heat-expandable microspheres, wherein the difference in the coefficient of variation of the particle size distribution between the heat-expanded microspheres and the heat-expandable microspheres is within +/−5%.

14. Heat-expanded microspheres according to claim 11, the heat-expanded microspheres having a re-expansion initiating temperature.

15. Heat-expanded microspheres according to claim 11, wherein the heat-expanded microspheres are wetted with a liquid organic compound that does not dissolve the shells thereof.

16. Heat-expanded microspheres according to claim 11, wherein the blowing agent contains a $C_{2-10}$ fluorine compound having an ether structure, and which contains no chlorine and bromine atoms.

17. Heat-expanded microspheres according to claim 16, wherein the thermoplastic resin is produced by polymerizing a monomer mixture consisting essentially of a nitrile monomer and a monomer having a carboxyl group, the weight ratio of the nitrile monomer ranging from 20 to 80 weight percent of the monomer mixture, and the weight ratio of the monomer having a carboxyl group ranging from 80 to 20 weight percent of the monomer mixture.

18. Heat-expanded microspheres according to claim 16, wherein the heat-expandable microspheres further comprise a particulate filler that adheres to the outer surface of the shells thereof, the particulate filler having an average particle size not greater than one tenth of the average particle size of the heat-expandable microspheres without the particulate filler adhered to the surface thereof, and is at least one anti-blocking agent selected from the group consisting of organic compounds having a melting point not lower than 90° C. and inorganic compounds having a layered structure.

19. Heat-expanded microspheres according to claim 16, the heat-expandable microspheres exhibiting a damage sealing function and a tire internal pressure supply function after a tire is damaged by filling the heat-expanded microspheres in a cavity of a tire-and-rim assembly.

20. Heat-expanded microspheres according to claim 11, which are produced by a method that comprises the steps of:
providing a plurality of heat-expandable microspheres, each heat-expandable microsphere comprising a shell of thermoplastic resin, and a blowing agent encapsulated therein having a boiling point not higher than the softening point of the thermoplastic resin, and the plurality of heat-expandable microsphere having an average particle size from 1 to 100 μm;
feeding a gas fluid containing the plurality of heat-expandable microspheres through a gas-introducing tube which has a dispersion nozzle on an outlet thereof, the dispersion nozzle being fixed inside a conduit with a hot gas flow flowing through the conduit, and then jetting the gas fluid from the dispersion nozzle;
colliding the gas fluid with a collision plate fixed on a downstream portion of the dispersion nozzle in order to disperse the plurality of heat-expandable microspheres in the hot gas flow; and
heating the plurality of dispersed heat-expandable microspheres in the hot gas flow at a temperature not lower than the expansion initiating temperature of the plurality of heat-expandable microspheres and thus expanding the same.

21. Heat-expandable microspheres, each heat-expandable microsphere comprising:
a shell of thermoplastic resin, and a blowing agent having a boiling point not higher than the softening point of the thermoplastic resin and encapsulated in the shell;
wherein the heat-expandable microspheres have an average particle size ranging from 1 to 1000 μm;
an expansion coefficient over 100% at their maximum expanding temperature;
contain not more than 5 weight percent of aggregated microspheres; and
contain not more than 5 weight percent of microspheres having a true specific gravity not lower than 0.79 g/cc at 25° C.

22. Heat-expandable microspheres according to claim 21, which further comprise a particulate filler that adheres to the outer surface of the shells thereof and has an average particle size not greater than 10 μm.

23. Heat-expandable microspheres according to claim 21, which contain not more than 1 weight percent of aggregated microspheres and not more than 3 weight percent of microspheres having a true specific gravity not lower than 0.79 g/cc at 25° C.

24. Heat-expandable microspheres according to claim 21, wherein the heat-expanded microspheres which are wetted with a liquid organic compound that does not dissolve the shells thereof.

25. Heat-expandable microspheres according to claim 21, wherein the blowing agent contains a $C_{2-10}$ fluorine compound having an ether structure, and which contains no chlorine and bromine atoms.

26. Heat-expandable microspheres according to claim 25, wherein the coefficient of variation of the particle size distribution thereof is not greater than 30%.

27. Heat-expandable microspheres according to claim 25, wherein the thermoplastic resin is produced by polymerizing a monomer mixture consisting essentially of a nitrile monomer and a monomer having a carboxyl group, the weight ratio of the nitrile monomer ranging from 20 to 80 weight percent of the monomer mixture, and the weight ratio of the monomer having a carboxyl group ranging from 80 to 20 weight percent of the monomer mixture.

28. Heat-expandable microspheres according to claim 25, further comprising a particulate filler that adheres to the outer surface of the shell, the particulate filler having an average particle size not greater than 10 μm, and is at least one selected from the group consisting of organic compounds having a melting point not lower than 90° C. and inorganic compounds having a layered structure.

29. Heat-expandable microspheres according to claim 25, the heat-expandable microspheres exhibiting a damage sealing function and a tire internal pressure supply function after a tire is damaged by filling the heat-expanded microspheres in a cavity of a tire-and-rim assembly.

30. A porous material composition, which comprises a base component, and heat-expanded microspheres according to claim 11.

31. A porous molded product produced by molding a porous material composition according to claim 30.

32. A porous material composition, which comprises a base component, and heat-expanded microspheres according to claim 21.

33. A porous molded product produced by molding a porous material composition according to claim 32.

* * * * *